(12) United States Patent
Hassan et al.

(10) Patent No.: US 10,911,141 B1
(45) Date of Patent: Feb. 2, 2021

(54) DYNAMICALLY SELECTING A CHANNEL MODEL FOR OPTICAL COMMUNICATIONS

(71) Applicant: Microsoft Technology Licensing, LLC, Redmond, WA (US)

(72) Inventors: Amer Aref Hassan, Kirkland, WA (US); Richard James Cole, Woodinville, WA (US); Whitney J Giaimo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/526,496

(22) Filed: Jul. 30, 2019

(51) Int. Cl.
| | |
|---|---|
| *H04B 10/079* | (2013.01) |
| *H04B 10/564* | (2013.01) |
| *H04B 10/516* | (2013.01) |
| *H04B 10/69* | (2013.01) |
| *H04L 27/38* | (2006.01) |
| *H04L 27/36* | (2006.01) |

(52) U.S. Cl.
CPC ... H04B 10/07955 (2013.01); H04B 10/5161 (2013.01); H04B 10/564 (2013.01); *H04B 10/07957* (2013.01); *H04B 10/69* (2013.01); *H04L 27/36* (2013.01); *H04L 27/38* (2013.01)

(58) Field of Classification Search
CPC .......... H04B 10/07955; H04B 10/5161; H04B 10/564; H04B 10/69; H04B 10/079; H04B 10/07957; H04B 10/11; H04B 10/54; H04B 10/516; G01J 3/00; H04L 27/36; H04L 27/38
USPC .......................................................... 398/38
See application file for complete search history.

(56) References Cited

U.S. PATENT DOCUMENTS

| | | | |
|---|---|---|---|
| 3,984,190 | A | 10/1976 | Barrett et al. |
| 4,150,284 | A | 4/1979 | Trenkler et al. |
| 4,476,495 | A | 10/1984 | Fujisawa et al. |
| 4,829,596 | A | 5/1989 | Barina |
| 5,179,592 | A | 1/1993 | Kusano |
| 5,410,147 | A | 4/1995 | Riza et al. |

(Continued)

FOREIGN PATENT DOCUMENTS

| | | |
|---|---|---|
| CN | 101681284 | 3/2010 |
| EP | 0234730 | 7/1992 |

(Continued)

OTHER PUBLICATIONS

US 10,666,358 B1, 05/2020, Hassan et al. (withdrawn)
(Continued)

*Primary Examiner* — Abbas H Alagheband
(74) *Attorney, Agent, or Firm* — Schwegman Lundberg & Woessner, P.A.

(57) ABSTRACT

A system for transmitting data over an optical communication path is configured to receive data to be encoded in a bitstream for transmission using an optical communication path and encodes the received data to obtain a bitstream. The system is further configured to determine that the bitstream includes a sequence of consecutive bits, and obtain a power level at which to transmit a portion of the bitstream based on a count of the consecutive bits in the sequence. The system may be configured to selectively activate a light source at a power level according to a modulation scheme to optically transmit the portion of the bitstream at the power level.

20 Claims, 14 Drawing Sheets

(56) References Cited

U.S. PATENT DOCUMENTS

| | | | |
|---|---|---|---|
| 5,604,766 A * | 2/1997 | Dohi | H04W 52/221 375/130 |
| 5,737,366 A | 4/1998 | Gehlot | |
| 5,793,880 A | 8/1998 | Constant | |
| 6,134,274 A | 10/2000 | Sankaranarayanan et al. | |
| 6,148,428 A | 11/2000 | Welch et al. | |
| 6,158,041 A | 12/2000 | Raleigh et al. | |
| 6,366,381 B1 | 4/2002 | Anderson | |
| 6,421,357 B1 | 7/2002 | Hall | |
| 6,424,444 B1 | 7/2002 | Kahn et al. | |
| 6,437,893 B1 | 8/2002 | Rivollet et al. | |
| 6,490,067 B2 | 12/2002 | Bloom et al. | |
| 6,580,535 B1 | 6/2003 | Schoenfelder | |
| 6,609,139 B1 | 8/2003 | Dultz et al. | |
| 6,757,299 B1 | 6/2004 | Verma | |
| 6,816,726 B2 | 11/2004 | Lysejko et al. | |
| 6,851,086 B2 | 2/2005 | Szymanski | |
| 6,868,236 B2 | 3/2005 | Wiltsey et al. | |
| 6,915,076 B1 | 7/2005 | Mittal et al. | |
| 6,934,317 B1 * | 8/2005 | Dent | H04L 1/0003 375/140 |
| 6,963,175 B2 | 11/2005 | Archenhold et al. | |
| 7,032,238 B2 | 4/2006 | Parnell et al. | |
| 7,113,708 B1 | 9/2006 | Creaney et al. | |
| 7,139,322 B1 | 11/2006 | Nergis | |
| 7,177,320 B2 | 2/2007 | Lysejko et al. | |
| 7,191,381 B2 | 3/2007 | Gesbert et al. | |
| 7,212,742 B2 | 5/2007 | Peddanarappagari et al. | |
| 7,215,721 B2 | 5/2007 | Hietala et al. | |
| 7,286,762 B2 | 10/2007 | Elahmadi et al. | |
| 7,292,639 B1 | 11/2007 | Demirekler et al. | |
| 7,307,569 B2 | 12/2007 | Vrazel et al. | |
| 7,477,849 B2 | 1/2009 | Ahmed et al. | |
| 7,489,875 B2 | 2/2009 | Murphy | |
| 7,580,630 B2 | 8/2009 | Kee et al. | |
| 7,599,338 B2 | 10/2009 | Sari | |
| 7,647,037 B2 | 1/2010 | Ayachitula et al. | |
| 7,689,130 B2 | 3/2010 | Ashdown | |
| 7,768,934 B2 | 8/2010 | Yamanaka et al. | |
| 7,792,200 B2 | 9/2010 | Molander | |
| 7,830,575 B2 | 11/2010 | Moon et al. | |
| 7,844,186 B2 | 11/2010 | Dorrer et al. | |
| 7,936,829 B2 | 5/2011 | Romero et al. | |
| 7,970,349 B2 | 6/2011 | Chen et al. | |
| 7,983,570 B2 | 7/2011 | Han et al. | |
| 7,986,783 B2 | 7/2011 | Ikushima et al. | |
| 8,059,697 B2 | 11/2011 | Dent | |
| 8,155,175 B2 | 4/2012 | Olgaard | |
| 8,189,407 B2 | 5/2012 | Strasser et al. | |
| 8,189,711 B2 | 5/2012 | Shimizu | |
| 8,213,801 B2 | 7/2012 | Nien et al. | |
| 8,270,525 B2 | 9/2012 | Nakagawa et al. | |
| 8,401,102 B2 | 3/2013 | Tsouri et al. | |
| 8,422,589 B2 * | 4/2013 | Golitschek Edler Von Elbwart | H04L 1/18 375/260 |
| 8,446,811 B2 | 5/2013 | Yue et al. | |
| 8,484,518 B2 | 7/2013 | Weeber | |
| 8,494,087 B2 | 7/2013 | Seyedi-esfahani | |
| 8,509,259 B2 | 8/2013 | Powell | |
| 8,552,659 B2 | 10/2013 | Ashdown et al. | |
| 8,559,378 B2 | 10/2013 | Schaepperle | |
| 8,842,761 B2 | 9/2014 | Barsoum et al. | |
| 8,873,965 B2 | 10/2014 | Giustiniano et al. | |
| 8,879,925 B2 | 11/2014 | Akiyama et al. | |
| 8,929,402 B1 | 1/2015 | Hughes | |
| 8,948,600 B2 | 2/2015 | Kwon et al. | |
| 9,071,306 B2 | 6/2015 | Kohda et al. | |
| 9,094,151 B2 * | 7/2015 | Perez De Aranda Alonso | H04J 14/08 |
| 9,176,810 B2 | 11/2015 | Peterson et al. | |
| 9,276,680 B2 | 3/2016 | Valencia et al. | |
| 9,386,587 B2 | 7/2016 | Hu et al. | |
| 9,444,669 B2 | 9/2016 | Brecher et al. | |
| 9,467,229 B2 * | 10/2016 | Kai | H04L 27/36 |
| 9,608,733 B2 | 3/2017 | Pavlas et al. | |
| 9,614,644 B2 * | 4/2017 | Jeong | H03M 13/1102 |
| 9,766,972 B2 | 9/2017 | Davis et al. | |
| 9,787,404 B2 | 10/2017 | Cesnik | |
| 9,792,176 B2 | 10/2017 | Blaichman et al. | |
| 9,806,739 B1 * | 10/2017 | Kojima | H03M 7/30 |
| 9,813,127 B2 | 11/2017 | George et al. | |
| 9,818,136 B1 | 11/2017 | Hoffberg | |
| 9,826,540 B1 | 11/2017 | Li et al. | |
| 9,859,977 B2 * | 1/2018 | Zhao | H04B 10/07955 |
| 9,946,723 B2 | 4/2018 | Lawrence | |
| 10,084,631 B2 | 9/2018 | Raphaeli et al. | |
| 10,117,120 B2 | 10/2018 | Sun et al. | |
| 10,135,540 B2 | 11/2018 | Medra et al. | |
| 10,182,480 B2 | 1/2019 | Scapa et al. | |
| 10,219,695 B2 | 3/2019 | Bhadri et al. | |
| 10,230,468 B2 * | 3/2019 | Mansouri Rad | H04B 3/32 |
| 10,231,687 B2 | 3/2019 | Kahn et al. | |
| 10,333,617 B2 * | 6/2019 | Moision | H04B 10/07955 |
| 10,333,622 B2 | 6/2019 | Bhoja et al. | |
| 10,404,379 B2 | 9/2019 | Shiraishi | |
| 10,476,728 B2 | 11/2019 | Zhang et al. | |
| 10,686,530 B1 * | 6/2020 | Hassan | H04B 10/60 |
| 2001/0033406 A1 | 10/2001 | Koike et al. | |
| 2002/0016945 A1 | 2/2002 | Sayood et al. | |
| 2002/0196510 A1 | 12/2002 | Hietala et al. | |
| 2003/0030873 A1 | 2/2003 | Hietala et al. | |
| 2003/0032391 A1 | 2/2003 | Schweinhart et al. | |
| 2003/0072050 A1 | 4/2003 | Vrazel et al. | |
| 2003/0076569 A1 | 4/2003 | Stevens | |
| 2003/0099302 A1 | 5/2003 | Tong et al. | |
| 2003/0223762 A1 | 12/2003 | Ho et al. | |
| 2004/0013429 A1 | 1/2004 | Duelk et al. | |
| 2004/0028412 A1 | 2/2004 | Murphy | |
| 2004/0057733 A1 | 3/2004 | Azadet et al. | |
| 2005/0012033 A1 | 1/2005 | Stern et al. | |
| 2005/0047517 A1 | 3/2005 | Georgios et al. | |
| 2005/0100336 A1 | 5/2005 | Mendenhall et al. | |
| 2005/0207754 A1 * | 9/2005 | Yamaguchi | H04B 10/077 398/38 |
| 2005/0213966 A1 | 9/2005 | Chown et al. | |
| 2006/0088110 A1 | 4/2006 | Romero et al. | |
| 2006/0115272 A1 | 6/2006 | Minato et al. | |
| 2006/0165190 A1 | 7/2006 | Tamaki et al. | |
| 2006/0203765 A1 | 9/2006 | Laroia et al. | |
| 2006/0204247 A1 | 9/2006 | Murphy | |
| 2007/0014286 A1 * | 1/2007 | Lai | H04L 5/023 370/389 |
| 2007/0041731 A1 | 2/2007 | Yasumoto et al. | |
| 2007/0092265 A1 | 4/2007 | Vrazel et al. | |
| 2007/0160212 A1 | 7/2007 | Zavriyev et al. | |
| 2007/0165862 A1 | 7/2007 | Young et al. | |
| 2007/0195589 A1 | 8/2007 | Hidaka | |
| 2007/0222654 A1 | 9/2007 | Vrazel et al. | |
| 2007/0280684 A1 | 12/2007 | Onoda et al. | |
| 2008/0019523 A1 | 1/2008 | Fuse et al. | |
| 2008/0055979 A1 | 3/2008 | Shim | |
| 2008/0082736 A1 | 4/2008 | Chow et al. | |
| 2008/0129564 A1 | 6/2008 | Kitayama et al. | |
| 2008/0166131 A1 | 7/2008 | Hudgins et al. | |
| 2008/0166135 A1 | 7/2008 | Ann | |
| 2008/0224635 A1 | 9/2008 | Hayes | |
| 2008/0240734 A1 | 10/2008 | Fuse | |
| 2009/0022241 A1 | 1/2009 | Fukuoka et al. | |
| 2009/0080556 A1 | 3/2009 | Duan et al. | |
| 2009/0092072 A1 | 4/2009 | Imamura et al. | |
| 2009/0148058 A1 * | 6/2009 | Dane | H04N 19/577 382/251 |
| 2009/0245809 A1 | 10/2009 | Nakamoto | |
| 2009/0269055 A1 | 10/2009 | Butler et al. | |
| 2010/0008214 A1 * | 1/2010 | Siaud | H03M 13/276 370/203 |
| 2010/0050050 A1 | 2/2010 | Nishi | |
| 2010/0054754 A1 | 3/2010 | Miller et al. | |
| 2010/0142965 A1 | 6/2010 | Walewski et al. | |
| 2010/0182294 A1 | 7/2010 | Roshan et al. | |
| 2010/0223530 A1 | 9/2010 | Son et al. | |
| 2010/0226449 A1 | 9/2010 | Ilow et al. | |

(56) References Cited

U.S. PATENT DOCUMENTS

| | | |
|---|---|---|
| 2010/0293440 A1 | 11/2010 | Thatcher et al. |
| 2011/0052195 A1 | 3/2011 | Karstens |
| 2011/0066902 A1 | 3/2011 | Sharon et al. |
| 2011/0131468 A1 | 6/2011 | Myers et al. |
| 2011/0234436 A1 | 9/2011 | Bogoni et al. |
| 2011/0255866 A1 | 10/2011 | Van Veen et al. |
| 2011/0280576 A1 | 11/2011 | Chan et al. |
| 2012/0057506 A1 | 3/2012 | Kumar |
| 2012/0060069 A1 | 3/2012 | Yu et al. |
| 2012/0063774 A1 | 3/2012 | Niibe et al. |
| 2012/0128367 A1 | 5/2012 | Yamada |
| 2012/0155354 A1 | 6/2012 | Kishigami et al. |
| 2013/0004172 A1 | 1/2013 | Sugawa et al. |
| 2013/0188956 A1 | 7/2013 | Abe et al. |
| 2013/0236171 A1 | 9/2013 | Saunders |
| 2013/0236194 A1 | 9/2013 | Saunders et al. |
| 2013/0238955 A1 | 9/2013 | D'abreu et al. |
| 2013/0287403 A1 | 10/2013 | Roberts |
| 2013/0343473 A1 | 12/2013 | Eliaz et al. |
| 2014/0043069 A1 | 2/2014 | Oh et al. |
| 2014/0072068 A1 | 3/2014 | Zhu et al. |
| 2014/0199075 A1 | 7/2014 | Huh et al. |
| 2014/0312777 A1 | 10/2014 | Shearer et al. |
| 2014/0313387 A1 | 10/2014 | Vogelsang et al. |
| 2014/0321863 A1 | 10/2014 | Diab |
| 2014/0334421 A1 | 11/2014 | Sosa et al. |
| 2014/0376663 A1 | 12/2014 | Ko et al. |
| 2015/0049844 A1 | 2/2015 | Stott |
| 2015/0063476 A1 | 3/2015 | Wang et al. |
| 2015/0071651 A1 | 3/2015 | Asmanis et al. |
| 2015/0071653 A1 | 3/2015 | Robinson et al. |
| 2015/0117433 A1* | 4/2015 | Zhang .............. H04L 27/2613 370/338 |
| 2015/0147069 A1 | 5/2015 | Brandt-pearce et al. |
| 2015/0193302 A1 | 7/2015 | Hyun et al. |
| 2015/0205664 A1 | 7/2015 | Janik et al. |
| 2015/0222359 A1 | 8/2015 | Kai et al. |
| 2015/0318928 A1 | 11/2015 | Yoo et al. |
| 2015/0365172 A1 | 12/2015 | Luo et al. |
| 2016/0028514 A1 | 1/2016 | Venkataraghavan et al. |
| 2016/0036525 A1 | 2/2016 | Pirkl |
| 2016/0042797 A1 | 2/2016 | Kim |
| 2016/0080087 A1 | 3/2016 | Koike-akino et al. |
| 2016/0119096 A1 | 4/2016 | Sun et al. |
| 2016/0127091 A1 | 5/2016 | Yan et al. |
| 2016/0239796 A1 | 8/2016 | Grant et al. |
| 2016/0266054 A1 | 9/2016 | Cao et al. |
| 2016/0315733 A1* | 10/2016 | Murakami .............. H04L 27/34 |
| 2016/0350187 A1 | 12/2016 | Saliba |
| 2017/0063466 A1 | 3/2017 | Wang et al. |
| 2017/0099139 A1 | 4/2017 | Han et al. |
| 2017/0141798 A1 | 5/2017 | Kudekar et al. |
| 2017/0168472 A1 | 6/2017 | Ando et al. |
| 2017/0180055 A1 | 6/2017 | Yu et al. |
| 2017/0207854 A1 | 7/2017 | Blumkin et al. |
| 2017/0250780 A1 | 8/2017 | Ge et al. |
| 2017/0302383 A1 | 10/2017 | Medra et al. |
| 2017/0325179 A1 | 11/2017 | Ameixieira |
| 2017/0366368 A1 | 12/2017 | Crayford et al. |
| 2018/0076836 A1 | 3/2018 | Zhu et al. |
| 2018/0103382 A1 | 4/2018 | Hassan et al. |
| 2018/0123840 A1* | 5/2018 | Dmitriev-Zdorov ....................... H04B 17/29 |
| 2018/0183516 A1* | 6/2018 | Moision .......... H04B 10/07955 |
| 2018/0199378 A1 | 7/2018 | Son et al. |
| 2018/0205465 A1 | 7/2018 | Tanaka et al. |
| 2018/0205503 A1 | 7/2018 | Chen et al. |
| 2018/0227651 A1 | 8/2018 | Brodsky et al. |
| 2018/0279270 A1 | 9/2018 | Sano et al. |
| 2018/0332373 A1 | 11/2018 | Wey et al. |
| 2018/0337816 A1 | 11/2018 | Herath et al. |
| 2019/0017824 A1 | 1/2019 | Qiu et al. |
| 2019/0052505 A1 | 2/2019 | Baldemair et al. |
| 2019/0081702 A1 | 3/2019 | Laycock et al. |
| 2019/0110084 A1 | 4/2019 | Jia et al. |
| 2019/0121417 A1 | 4/2019 | Schneider et al. |
| 2019/0140741 A1 | 5/2019 | Cheng et al. |
| 2019/0149236 A1 | 5/2019 | Wang et al. |
| 2019/0149265 A1 | 5/2019 | Das Sharma |
| 2019/0191383 A1 | 6/2019 | Dang et al. |
| 2019/0214852 A1* | 7/2019 | Park ...................... H02M 3/337 |
| 2019/0239753 A1 | 8/2019 | Wentz |
| 2019/0245646 A1 | 8/2019 | Robert Safavi et al. |
| 2019/0260394 A1* | 8/2019 | Motwani ............ H03M 13/1111 |
| 2019/0280809 A1 | 9/2019 | Cho et al. |
| 2019/0312694 A1 | 10/2019 | Jia et al. |
| 2019/0317286 A1 | 10/2019 | Seyedi et al. |
| 2019/0317315 A1 | 10/2019 | Wang et al. |
| 2019/0376820 A1 | 12/2019 | Jones et al. |
| 2020/0186189 A1 | 6/2020 | Herath et al. |

FOREIGN PATENT DOCUMENTS

| | | |
|---|---|---|
| EP | 0975104 | 1/2000 |
| JP | 2009535924 | 10/2009 |
| JP | 2011135161 | 7/2011 |
| KR | 20140037313 | 3/2014 |
| WO | 02028041 | 4/2002 |
| WO | 2008046163 | 4/2008 |
| WO | 2008095334 A1 | 8/2008 |
| WO | 2013086311 A1 | 6/2013 |
| WO | 2019047162 | 3/2019 |

OTHER PUBLICATIONS

"Non Final Office Action Issued in U.S. Appl. No. 16/388,373", dated Nov. 15, 2019, 09 Pages.

"T1.2 Project xxxx Rev 0.5", Information Technology: Fibre Channel—Methodologies for Signal Quality Specification—3 FC-MSQS-3, (Jan. 26, 2017), 22 Pages.

"LDM Layered Division Multiplexing Power Division Multiplexing", Retrieved from the Intenet; >URL: https: web.archive.org web 20170220135434 http: www.rfwireless-world.com Terminology LDM-vs-TDm-vs-FDM.html, (Feb. 20, 2017), 5 Pages.

"Poisson Regression", [online]. Retrieved from the Internet: <URL: https: docs.microsoft.com en-us azure machine-learning studio-module-reference poisson-regression>, (Jan. 27, 2018), 7 Pages.

"U.S. Appl. No. 16/513,101, Ex Parte Quayle Action dated Mar. 6, 2020", 6 Pages.

"U.S. Appl. No. 16/512,668, Non Final Office Action dated May 18, 2020", 8 Pages.

"Application as Filed in U.S. Appl. No. 16/388,373, filed Apr. 18, 2019, 92 Pages.", 92 Pages.

"Notice of Allowance Issued in U.S. Appl. No. 16/388,373", dated Feb. 27, 2020, 11 Pages.

Ali, Ssjjsf, "Peak-to-Average Power Ratio Reduction Using N-tuple Selective Mapping Method for MC-CDMA", In Journal of ETRI, vol. 37, Issue 2, (Apr. 2, 2015), pp. 338-347.

Dash, S. S., "Constellation Modulation—An Approach to Increase Spectral Efficiency", In Journal of Optics Express, vol. 25, Issue 14, (Jul. 10, 2017), 12 Pages.

Donovan, James, "How Multiplexing Techniques Enable Higher Speeds on Fiber Optic Cabling", [online]. Retrieved from the Internet: <URL: https: www.commscope.com Blog How-Multiplexing-Techniques-Enable-Higher-Speeds-on-Fiber-Optic-Cabling>, (Jul. 25, 2016), 7 Pages.

Feng, Zhenhua, "Digital Domain Power Division Multiplexing DDO-OFDM Transmission with Successive Interference Cancellation", In Conference on Lasers and Electro-Optics, (Jun. 5, 2016), 2 Pages.

Khan, Talha A., "Visible Light Communication using Wavelength Division Multiplexing for Smart Spaces", In Proceedings of the IEEE Consumer Communications and Networking Conference (CCNC), (Jan. 14, 2012), pp. 230-234.

Quimby, Richard S., "Section 24-3. Power Budget in Fiber Optic Link—Receiver Sensitivity, Photonics and Lasers—An Introduction", John Wiley and Sons, Inc. Hoboken, New Jersey, (2006), pp. 464-469.

(56) References Cited

OTHER PUBLICATIONS

Quimby, Richard S., "Photonics and Lasers: An Introduction", n Publications of John Wiiey and Sons, (Apr. 14, 2005). 533 Pages.
Sharma, V., "Bit Error Rate Improvement by using Active Constellation Extension and Neural Network in OFDM System", In Journal of Network Communications and Emerging Technologies, vol. 6, Issue 3, (Mar. 2016), pp. 33-36.
Taher, M. A., "Reducing the PAPR of OFDM Systems by Random Variable Transformation", In Journal of ETRI, vol. 35, Issue 4, (Aug. 30, 2013), pp. 714-717.
Van Der Bij, Erik, "Fibre Channel Overview", [online]. Retrieved from the Internet: <URL: http: hsi.web.cern.ch HSI fcs spec overview. htm>, (Aug. 15, 1994), 10 Pages.
Wu, Qiong, "Digital Domain Power Division Multiplexed Dual Polarization Coherent Optical OFDM Transmission", Journal of Scientific Reports, vol. 8, No. 1, (Oct. 25, 2018), 8 Pages.
Wu, Shijuan, "A New Constellation Diagram-Based Signal Detection for GSM-MIMO Systems", In Journal of IEEE Communications Letters, vol. 22, Issue 3, (Mar. 2018), pp. 502-505.
"Non Final Office Action Issued in U.S. Appl. No. 16/512,709", dated Jul. 21, 2020, 17 Pages.
"Non Final Office Action Issued in U.S. Appl. No. 16/512,786", dated Aug. 6, 2020, 6 Pages.
"Non Final Office Action Issued in U.S. Appl. No. 16/512,802", dated Jun. 26, 2020, 11 Pages.
"International Search Report & Written Opinion Issued in PCT Application No. PCT/US20/024323", dated Aug. 3, 2020, 11 Pages.
"International Search Report & Written Opinion Issued in PCT Application No. PCT/US20/033888", dated Jul. 31, 2020, 12 Pages.
"International Search Report and Written Opinion Issued in PCT Application No. PCT/US2020/034586", dated Sep. 8, 2020, 13 Pages.
"International Search Report and Written Opinion Issued in PCT Application No. PCT/US2020/033012", dated Aug. 20, 2020, 12 Pages.
"International Search Report and Written Opinion Issued in PCT Application No. PCT/US20/036867", dated Oct. 7, 2020, 10 Pages.
"Non Final Office Action Issued in U.S. Appl. No. 16/513,159", dated Oct. 29, 2020, 12 Pages.

* cited by examiner

DYNAMICALLY SELECTING A CHANNEL MODEL FOR OPTICAL COMMUNICATIONS

TECHNICAL FIELD

The subject matter disclosed herein generally relates to optical encoding techniques and, in particular, to dynamically selecting a channel model from a set of channel models for transmitting an encoded bitstream over an optical communication path, where the channel model maps transmission power levels to corresponding sets of binary values that repeat.

BACKGROUND

Optical communications (such as fiber optic communications) use light to communicate between an optical transmitter and an optical receiver (e.g., a photodetector). Optical communications may be used in telecommunications to communicate large amounts of data (e.g., voice traffic, network traffic, etc.) over large distances between two points. An optical communication path, such as a fiber optic fiber, may carry optical network traffic for hundreds or thousands of devices. As the number of devices increases, so too does the demand for optical communication bandwidth. With the increase in demand for optical communication bandwidth, there also comes a need for new and improved ways of encoding the optical network traffic. By employing different optical encoding schemes that compress the bitstream, an optical communication path can be improved to carry additional optical network traffic without having to physically alter the optical communication path.

One of the challenges in encoding data over an optical communication path is that attributes or characteristics of the optical communication path may introduce errors in the bitstream being transmitted. The possibility of errors further increases with additional layers of compression. Thus, when the bitstream is being transmitted, the receiver may interpret received bits as other values, such as interpreting a '0' as a '1' or a repeated set of values for another value (e.g., the value of '000' may be mistakenly interpreted as '11').

SUMMARY

To address these and other problems that arise within the field of optical communications, this disclosure provides for different types of channel models for communicating information using an optical communication path. The channel models may be each associated with an bit-error rate. With each channel model, a first transmission power output may be mapped to a particular binary character. Furthermore, to accommodate differences and/or deviations in an optical communication path, repeated instances of the particular binary character may be mapped to higher or different transmission power outputs. During transmission, a single instance of the particular binary character is transmitted at a power that reflects the number of repeated instances as given by the mapping of the particular channel model in use. Each different channel model may include different mappings to accommodate the differences and/or deviations in the optical communication path. In addition, an optical transmitter and an optical receiver may each be configured or programmed with the channel models such that the optical receiver is aware of the encoding scheme used for a particular channel model. Thus, when the optical transmitter begins transmitting an encoded bitstream, the optical transmitter informs the optical receiver with the particular channel model being used.

Additionally, the optical transmitter and optical receiver may communicate using feedback messages, where the optical receiver communicates errors or a determined bit-error rate to the optical transmitter. The feedback messages inform the optical transmitter as to which channel model should be used for a particular optical communication path. As each channel model may be associated with a different bit-error rate, the optical transmitter may be configured to select the channel model that has an acceptable error rate (e.g., an error rate within a tolerance threshold) compared to the errors and/or bit-error rate determined by the optical receiver. Thus, the optical transmitter is configured to select different channel models to accommodate potential errors in a bitstream communicated to the optical receiver. Additionally, the optical transmitter may be configured to select different channel models for different portions of the bitstream. For example, certain data may be require less bandwidth but be more sensitive to latency—in these examples a channel model that has a lower error rate may be selected.

The proposed solutions thus match the needs of the transmitter and receiver with a channel model that suits those needs to ensure optimal communications. By allowing for dynamic switching between channel models the present solution allows for data transmission to be optimized for the current channel conditions and for the currently transmitted data.

Accordingly, this disclosure describes a method for transmitting data over an optical communication path, wherein the method includes receiving a bitstream for transmission over an optical communication path and selecting a channel model from a plurality of channel models for transmitting a portion of the received bitstream, wherein selecting the channel model is based upon a characteristic of a transmitter and a target bit-error rate given a characteristic of the optical communication path. The plurality of channel models includes a first channel model comprising a first association between a first bit value with a first transmission power level, the first bit value being transmitted by transmitting at the first power level. The plurality of channel models also includes a second channel model that includes a second association between the first bit value with a second transmission power level, the first bit value being transmitted by transmitting at the second power level, and a third association between repeated, consecutive first bit values and a third transmission power level, the repeated, consecutive first bit values being transmitted by transmitting a single bit of the first bit value at the third transmission power level. The method further includes transmitting, at the transmitter, the portion of the bitstream according to the selected channel model.

In another embodiment of the method, the characteristic of the transmitter comprises a maximum, configured output transmission power level.

In yet a further embodiment of the method, the maximum, configured output transmission power level comprises a power level that increases linearly with an input power level.

In another embodiment of the method, selecting the channel model from the plurality of channel models is further based on whether the portion of the received bitstream corresponds to control bits.

In a further embodiment of the method, selecting the channel model from the plurality of channel models is further based on a priority level of data corresponding to the portion of the received bitstream.

In yet another embodiment of the method, the first transmission power level corresponds to a first value in the first channel model and the second transmission power level corresponds to a second value in the second channel model, and the second value is less than the first value.

In yet a further embodiment of the method, the method includes receiving a feedback message from a receiver of the portion of the bitstream indicating a threshold number of errors in the transmission of the portion of the bitstream, selecting a different channel model from the plurality of channel models in response to the received feedback message, and re-transmitting the portion of the bitstream according to the different channel model.

In another embodiment of the method, selecting the channel model from the plurality of channel models is based on a plurality of previously received feedback messages indicating an error rate corresponding to a previously selected channel model used to previously transmit another bitstream.

This disclosure further describes a system for transmitting data over an optical communication path, wherein the system includes a computer storage device having computer-executable instructions stored thereon a processor communicatively coupled to the computer storage device that, having executed the computer-executable instructions, configures a system to perform a plurality of operations. The plurality of operations includes receiving a bitstream for transmission over an optical communication path, selecting a channel model from a plurality of channel models for transmitting a portion of the received bitstream, wherein selecting the channel model is based upon a characteristic of a transmitter and a target bit-error rate given a characteristic of the optical communication path. The plurality of channel models includes a first channel model comprising a first association between a first bit value with a first transmission power level, the first bit value being transmitted by transmitting at the first power level, and a second channel model that includes a second association between the first bit value with a second transmission power level, the first bit value being transmitted by transmitting at the second power level, and a third association between repeated, consecutive first bit values and a third transmission power level, the repeated, consecutive first bit values being transmitted by transmitting a single bit of the first bit value at the third transmission power level. The plurality of operations also includes transmitting, at the transmitter, the portion of the bitstream according to the selected channel model.

In another embodiment of the system, the characteristic of the transmitter comprises a maximum, configured output transmission power level.

In a further embodiment of the system, the maximum, configured output transmission power level comprises a power level that increases linearly with an input power level.

In yet another embodiment of the system, selecting the channel model from the plurality of channel models is further based on whether the portion of the received bitstream corresponds to control bits.

In another embodiment of the system, selecting the channel model from the plurality of channel models is further based on a priority level of data corresponding to the portion of the received bitstream.

In a further embodiment of the system, the first transmission power level corresponds to a first value in the first channel model and the second transmission power level corresponds to a second value in the second channel model, and the second value is less than the first value.

In yet another embodiment of the system, the plurality of operations further comprises receiving a feedback message from a receiver of the portion of the bitstream indicating a threshold number of errors in the transmission of the portion of the bitstream, selecting a different channel model from the plurality of channel models in response to the received feedback message, and re-transmitting the portion of the bitstream according to the different channel model.

In yet a further embodiment of the system, selecting the channel model from the plurality of channel models is based on a plurality of previously received feedback messages indicating an error rate corresponding to a previously selected channel model used to previously transmit another bitstream.

This disclosure also describes a computer storage device having computer-executable instructions stored thereon that, when executed by a processor, causes a system to perform a plurality of operations comprising receiving a bitstream for transmission over an optical communication path and selecting a channel model from a plurality of channel models for transmitting a portion of the received bitstream, wherein selecting the channel model is based upon a characteristic of a transmitter and a target bit-error rate given a characteristic of the optical communication path. The plurality of channel models includes a first channel model comprising a first association between a first bit value with a first transmission power level, the first bit value being transmitted by transmitting at the first power level. The plurality of channel models also includes a second channel model comprising a second association between the first bit value with a second transmission power level, the first bit value being transmitted by transmitting at the second power level, and a third association between repeated, consecutive first bit values and a third transmission power level, the repeated, consecutive first bit values being transmitted by transmitting a single bit of the first bit value at the third transmission power level. The plurality of operations further includes transmitting, at the transmitter, the portion of the bitstream according to the selected channel model.

In another embodiment of the computer storage device, the characteristic of the transmitter comprises a maximum, configured output transmission power level.

In a further embodiment of the computer storage device, selecting the channel model from the plurality of channel models is further based on whether the portion of the received bitstream corresponds to control bits.

In yet another embodiment of the computer storage device, selecting the channel model from the plurality of channel models is further based on a priority level of data corresponding to the portion of the received bitstream.

BRIEF DESCRIPTION OF THE DRAWINGS

Some embodiments are illustrated by way of example and not limitation in the figures of the accompanying drawings.

DETAILED DESCRIPTION

Figure 1:
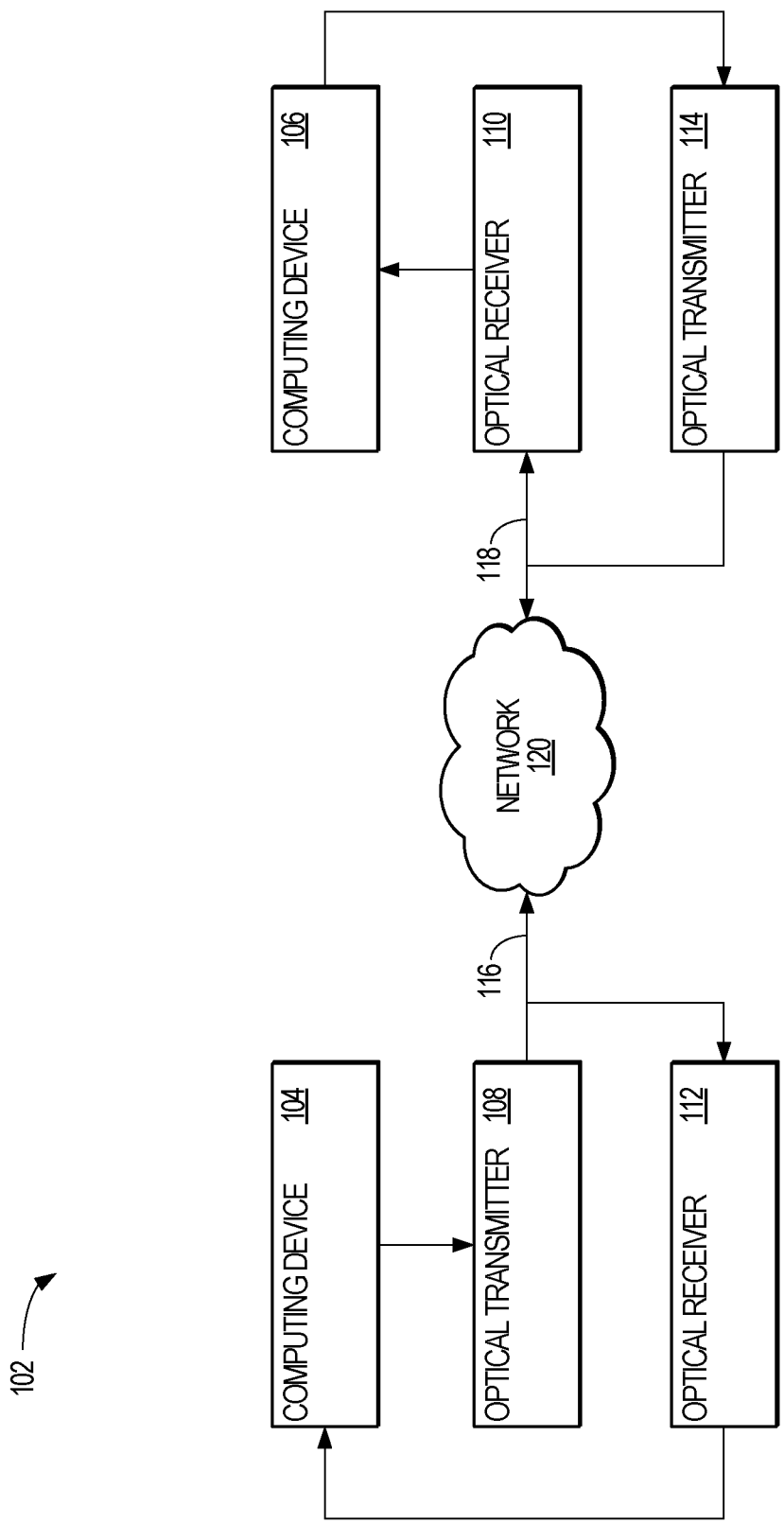
FIG. 1 is a block diagram illustrating an optical transmitter in communication with an optical receiver using one or more optical communication paths, according to an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

As previously stated, various encoding schemes may increase bandwidth of the optical communications. In some examples, one such optical encoding scheme that increases the bandwidth of the optical communications includes a power-based compression scheme that may be applied to a bitstream as part of a transmission of the bitstream over the optical communication channel. In the power-based compression scheme, successive repeated binary values may be transmitted as a single binary value with the number of successive repeated values being represented by a power level that the single binary value is transmitted at. For example, the power level may be positively correlated (or otherwise mapped to) the number of successive repeated values. As an example, suppose that the binary character of '1' is mapped to a first transmission power level of 5 dBm, and that the encoded bitstream to be transmitted is "1 1 1 1 1." Further still, that the power-based compression algorithm introduces an additional 2 dBm for each additional binary character being replaced after the first binary character. Accordingly, in this example, the encoded bitstream of "1 1 1 1 1" is replaced with a single binary character, "1". In addition, rather than designate the five binary is to be transmitted at five separate instances (e.g., $T_1$, $T_2$, $T_3$, etc.) at a power level of 5 dBm each, the light source is instructed to transmit a single binary character of "1" at a power level of 13 dBm (e.g., the initial 5 dBm for the first binary character, and then an additional 2 dBm for each additional binary character) at a single time period (e.g., $T_1$). When the receiver detects the increased power level of the received transmission packet at the single time period, the receiver applies a power-based decompression algorithm to determine that the received transmission packet represents multiple binary characters, and determines the number of binary characters represented by the single transmission packet. For example, the receiver may be trained to detect the various power levels and may map the power level back to a number of repeated bit values.

As can be appreciated the power levels of each particular mapping are determined by the power range of the transmitter and the number of individual power increments needed to transmit each different sequence of repeated values. For example, if the power levels are evenly distributed in the power range of the transmitter, and the transmitter has a 100 dBm range, and the system can encode a maximum of five repeated values, then '1' may be transmitted at 20 dBm, "1 1" may be transmitted at 40 dBm, "1 1 1" may be transmitted at 60 dBm, "1 1 1 1" may be transmitted at 80 dBm, and "1 1 1 1 1" may be transmitted at 100 dBm. As can be appreciated, as either the transmitter range decreases and/or the number number of power level increases (e.g., the compression levels increase) the spacing between each power level may get closer. As the spacing is decreased, the chance that the receiver misinterprets one power level for another, neighboring power level increases. This then increases a bit error rate.

To accommodate variations on optical channel conditions, data needs, and other factors, the optical transmitter and/or optical receiver may implement different channel models, where the channel models define a maximum number of successive bits that can be encoded with the power-based compression as well as the <bit values>-to-<transmission power level> mappings. Examples of the various channel models is further discussed with reference to FIGS. 6A-6C. The channel models may be selected based on the optical communication path characteristics which may include, but is not limited to, the distance between the optical transmitter and the optical receiver, one or more feedback messages communicated by the optical receiver to the optical transmitter, the amount of attenuation within the optical communication path, data characteristics, or any other such characteristics or combinations thereof. As stated previously, some data may be transmitted using a first channel model and then other data may be transmitted using a different channel model.

This disclosure now turns to the various disclosed embodiments that implement the technical aspects described herein. FIG. 1 is a block diagram illustrating two computing devices 104-106 in communication with each other via a first optical transmitter 108 and a second optical transmitter 114 and using a first optical receiver 110 and a second optical receiver 112. The computing device 104 sends data to the computing device 106 via the optical transmitter 108, which uses a selected channel model to compress a bitstream for transmission over optical communication paths 116-118. Optical receiver 110 is configured to receive the compressed bitstream from the optical transmitter 108, and communicate the uncompressed data to the computing device 106. In some examples, the data is encoded with one or more codes, such as error correction codes before transmission across optical communication paths 116-118. In these examples, the optical receiver 110 or the computing device 106 may decode the data prior to use. In similar fashion, the optical transmitter 114 sends data from the computing device 106 to the optical receiver 112, which communicates the received data to the computing device 104.

The optical transmitter 108 may be in direct communication with the optical receiver 110 via one or more optical communication paths 116-118. Additionally, and/or alternatively, a network 120 may be disposed between the optical transmitter 108 and the optical receiver 110, and the optical transmitter 108 and the optical receiver 110 communicate via the optical communication paths 116-118 and the network 120.

The computing device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that a user may utilize to perform various computing tasks (e.g., accessing the Internet, making a phone call, conducting a video conference, etc.). In some embodiments, the computing device 104 may comprise a display module (not shown) to display information (e.g., in the form of user interfaces). In further embodiments, the computing device 104 may comprise one or more of touch screens, accelerometers, gyroscopes, cameras, microphones, global positioning system (GPS) devices, and so forth.

The computing device 106 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that a user may utilize to perform various computing tasks (e.g., accessing the Internet, making a phone call, conducting a video conference, etc.). In some embodiments, the computing device 106 may comprise a display module (not shown) to display information (e.g., in the form of user interfaces). In further embodiments, the computing device 106 may comprise one or more of touch screens, accelerometers, gyroscopes, cameras, microphones, global positioning system (GPS) devices, and so forth.

In addition, the computing device 104 and/or the computing device 106 may be implemented as a server that provides various functionalities and/or computerized services. For example, the computing device 104 and/or the computing device 106 may provide file-hosting services, video streaming services, audio streaming services, webpage hosting services, online gaming services, online banking services or any other computerized service or combination thereof. The computing devices 104-106 may be implemented as a client/server relationship (e.g., computing device 104 is a client device and computing device 106 is a server device), as a peer-to-peer relationship (e.g., computing device 104 is a client device and computing device 106 is a client device), or a server-to-server relationship (e.g., both computing device 104-106 are implemented as servers and communicate with each other to provide various services to one another). In some examples, the computing devices 104 and 106 may include the respective optical transmitters 108,114 and optical receivers 110,112.

The network 120 disposed between the computing device 104 and the computing device 106 may include one or more types of networks. For example, the network 120 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The optical communication paths 116-118 may include one or more physical mediums through which a laser or light is communicated. One example of a transmission medium that may be included in the optical communication path 116-118 is one or more optical fibers, such as single mode optical fiber or multi-mode optical fiber, where the optical fibers comprise glass optical fiber, polymer optical fiber, or combinations thereof. Another example of a transmission medium is a gas, such as air, where the optical transmitter 108 communicates with the optical receiver 110 by sending one or more transmission packets over and/or through the gas.

In FIG. 1, the communication between the optical transmitter 108 and the optical receiver 110 is shown as a unidirectional pathway (e.g., the optical transmitter sends transmission packets to the optical receiver 110). However, in other embodiments, the computing device 106 may also be in communication with an optical transmitter (not shown) that communicates with an optical receiver (not shown) communicatively coupled to the computing device 104. Thus, the communication between the computing device 104 and the computing device 106 may also be a bi-directional communication pathway.

Figure 2:
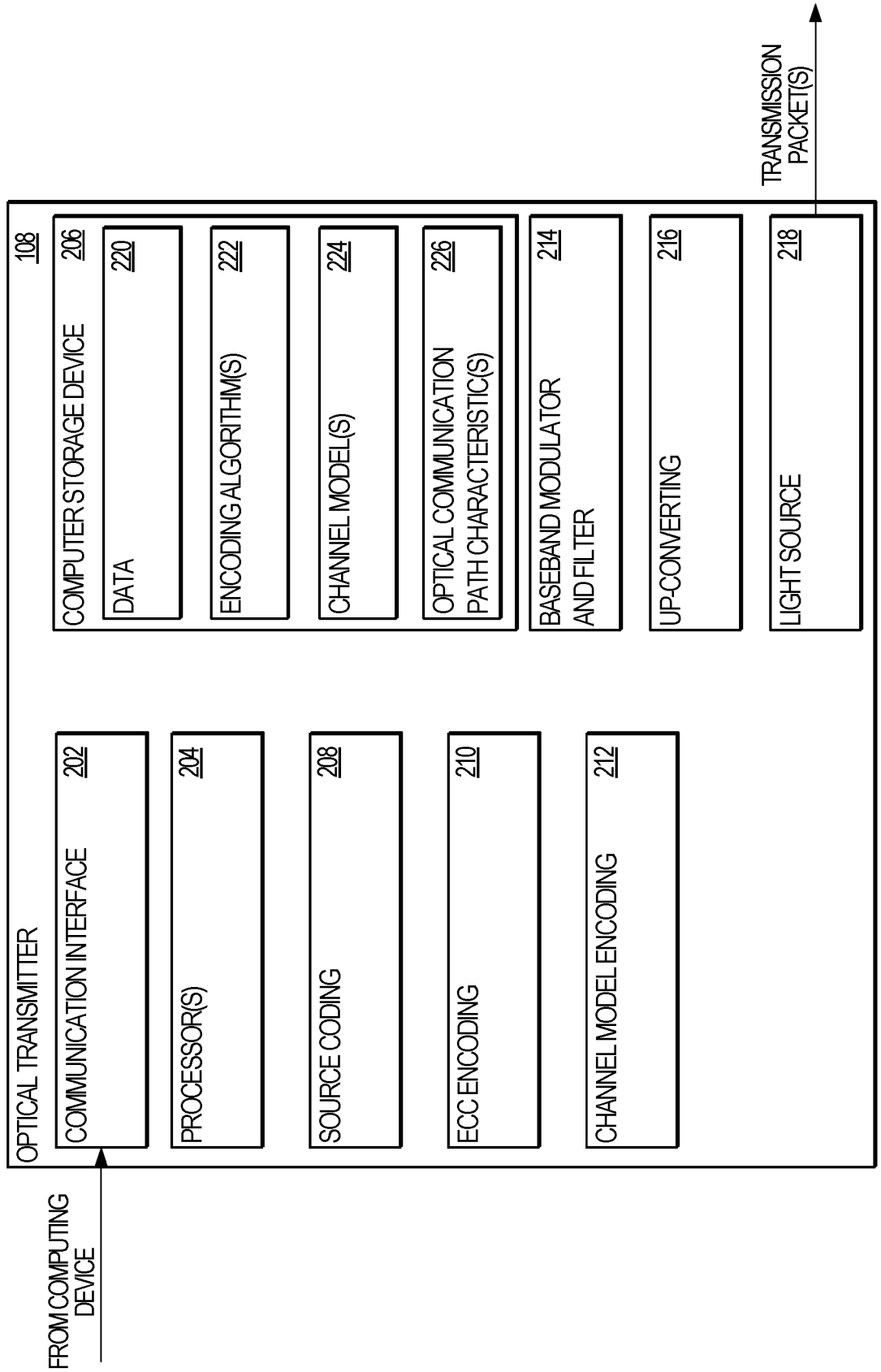
FIG. 2 illustrates the components of the optical transmitter shown in FIG. 1, according to an example embodiment.

FIG. 2 illustrates components of the optical transmitter 108 shown in FIG. 1, according to an example embodiment. The optical transmitter 114 may include similar components as those of optical transmitter 108. Furthermore, one of ordinary skill in the art will appreciate that the embodiments discussed with reference to the optical transmitter 108 may also apply to the optical transmitter 114. As shown in FIG. 2, and in one embodiment, the optical transmitter 108 includes various components 202-218. These components 202-218 include, but are not limited to, a communication interface 202, one or more processor(s) 204, a computer storage device 206, a source coding module 208, an error control coding (ECC) module 210, and a channel model encoding module 212. The components 202-218 further include a baseband modulator/filter 214, an up-converting module 216, and a light source 218.

The various component 202-218 of the optical transmitter 108 may be implemented in a single device, may reside on a single device, or may be distributed across several devices in various arrangements. The various components 202-218 of the optical transmitter 108 may access one or more computer storage devices for configuration information and/or implementation algorithms, and each of the various components 202-218 may be in communication with one another (e.g., via one or more communication buses or the like). Further, while the components 202-218 of FIG. 2 are discussed in the singular sense, it will be appreciated that in other embodiments multiple instances of the components 202-218 may be employed.

One or more of the components 208-218 may be implemented in hardware and/or software. In one embodiment, the components 208-218 are implemented as dedicated circuits, such as Application Specific Integrated Circuits (ASICs) where the dedicated circuits are configured to perform predetermined functions. For example, the source coding module 208 may be implemented as an ASIC configured to perform Huffman coding on the bitstream corresponding to data 220. As another example, the Error Correction Code (ECC) module 210 may be implemented as an ASIC configured to implement Reed Solomon codes on the encoded bitstream output by the source coding module 208. Additionally, and/or alternatively, the components 208-218 may be implemented as software, where the processor(s) 204 are configured to execute computer-readable instructions that implement the components 208-218. Furthermore, combinations of the foregoing are possible, where some modules are implemented as dedicated circuits and other modules are implemented in software. In this manner, the optical transmitter 108 may include components 208-218 that are implemented in hardware and/or software.

The communication interface 202 is configured to communicate with the computing device 104. In this regard, communication with the computing device 104 includes receiving data from the computing device 104 and/or sending data to the computing device 104. The optical transmitter 108 may also receive instructions and/or configurations from the computing device 104 via the communication interface 202. For example, the optical transmitter 108 may receive data 220 and/or one or more encoding algorithm(s) 222 from the computing device 104.

The communication interface 202 may include one or more wired and/or wireless communication interfaces. For example, the communication interface 202 may include a wireless transceiver, a Bluetooth® radio, and/or a wired network interface. In one embodiment, the communication interface 202 is configured to establish a wireless communication channel with the computing device 104 using one or more wireless communication protocols such as 802.11 b/g/n. Additionally, and/or alternatively, the optical transmitter 108 may establish a communication channel with the computing device 104 via a wire or other physical medium (e.g., via an Ethernet cable or the like). In yet another embodiment, the communication interface 202 is a local bus, which allows direct communication between the optical transmitter 108 and the computing device 104.

The processor(s) 204 are configured to execute computer-readable instructions that implement one or more of the modules 208-216. Additionally, and/or alternatively, the processor(s) 204 may be configured to retrieve computer-readable instructions from the computer storage device 206. The one or more processor(s) 204 may be any type of commercially available processor, such as processors available from the Intel Corporation, Advanced Micro Devices, Texas Instruments, or other such processors. Further still, the one or more processor(s) 204 may include one or more special-purpose processors, such as a Field-Programmable Gate Array (FPGA) or an Application Specific Integrated Circuit (ASIC). The one or more processor(s) 204 may also include programmable logic or circuitry that is temporarily configured by software to perform certain operations. Thus, once configured by such software, the one or more processor(s) 204 become specific machines (or specific components of a machine) uniquely tailored to perform the configured functions and are no longer general-purpose processor(s) 204.

Where the one or more processor(s) 204 implement the modules 208-216 via one or more computer-readable instructions, the computer-readable instructions may be written in one or more computer-programming and/or computer-scripting languages. Examples of such languages include, but are not limited to, C, C++, C #, Java, JavaScript, Perl, Python, or any other computer programming and/or scripting language now known or later developed.

The optical transmitter 108 may further include various computer storage device(s) 206 and/or computer-readable medium(s) for storing the data 220 encoding algorithm(s) 222, channel model(s) 224, and optical communication path characteristic(s) 226. The computer storage device 204 includes one or more physical devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer storage device" should be taken to include a single device or multiple devices (e.g., a centralized or distributed database, or associated caches and servers) able to store the data 220 and the one or more encoding algorithm(s) 222. Accordingly, the computer storage device 204 may be implemented as a single storage apparatus or device, or, alternatively and/or additionally, as "cloud-based" storage systems or storage networks that include multiple storage apparatus or devices.

The data 220 of the computer storage device 206 includes the information that the computing device 104 intends to transmit to the computing device 106. The data 220 may also include computer-readable instructions that configure the one or more processor(s) 204 to implement one or more of the modules 208-216.

The encoding algorithm(s) 222 include one or more encoding algorithms for encoding the data 220 to be transmitted via the light source 218. In one embodiment, the encoding algorithm(s) 222 include one or more source coding algorithms for implementation by the source coding module 208. Examples of source coding algorithms that may be included in the encoding algorithm(s) 222 include Huffman coding, Lempel-Ziv coding, Shannon-Fano coding, and other such coding algorithms or combinations thereof.

Additionally, and/or alternatively, the encoding algorithm(s) 222 include one or more error-correction coding algorithms that are applied by the ECC module 210. For example, the ECC module 210 may reference a memory address of the computer storage device 206 to retrieve the error-control coding algorithm to apply to an encoded bitstream. Alternatively, the ECC module 210 may reference a variable name, which may store a variable value or a constant value, where the value referenced by the variable name indicates the error-control coding algorithm to apply. The error-control coding algorithms applicable by the ECC module 210 may include, but are not limited to, Hamming codes, Reed Solomon codes, and other such error-correction coding techniques, or combinations thereof.

The channel model(s) 224 include one or more channel models that define various power-based compression algorithms for the channel model encoding module 212. In one embodiment, the channel model(s) 224 include mappings that map repeated runs of a binary character within the encoded bitstream (e.g., a bitstream where a source coding was applied) to particular power levels transmittable by the light source 218.

In some instances, the run of repeated binary characters includes a repeated "1" value (e.g., "1 1 1," "1 1 1 1," "1 1 1 1 1," etc.). In other instances, the run of repeated binary characters includes a repeated "0" value (e.g., "0 0 0," "0 0 0 0," "0 0 0 0 0," etc.). The channel model(s) 224 may include multiple channel models performing power-based compression on repeated "1" values, multiple channel models for performing power-based compression on repeated "0" values, or combinations of such algorithms. In still other examples, the run of repeated characters includes repeated values of binary sequences of multiple binary bits. For example, "0 1 1 0" or some other sequence. The repeated binary characters or sequences of binary characters may be transmitted by transmitting a single binary character or sequence at a power level correlated to a number of binary characters or sequences that are repeated.

The optical communication path characteristic(s) 226 include one or more optical communication path attributes with corresponding values that specify a particular attribute of the optical communication path being used by the optical transmitter 108. An example of an optical communication path attribute is the distance between the optical transmitter 108 and the optical receiver 110, which may be specified in a unit of distance (e.g., feet, meters, yards, etc.). Another example of an optical communication path attribute is a current bit-error rate of a current bitstream being transmitted from the optical transmitter 108 to the optical receiver 110. The channel model encoding module 212 may be configured to accept the optical communication path characteristic(s) 226 as an input in selecting a channel model 224 for compressing the encoded bitstream. Having multiple channel models 224 to choose from allows the channel model encoding module 212 to select the best and/or most appropriate channel model 224 for compressing the encoded bitstream. For example, the bit-error rate may be compared with a threshold associated with each of the channel model(s) 224 and the channel model encoding module 212 may be configured to select a channel model 224 where the bit-error rate associated with the channel model 224 is less than or equal to the current bit-error rate associated with the current bitstream. Yet a further example of an optical communication path attribute is a prior bit-error rate or previous bit-error rates, which, like the current bit-error rate, may be used by the channel model encoding module 212 to select a channel model 224. By having multiple channel models 224 associated with different bit-error rates, the channel model encoding module 212 can adaptively choose which of the channel models 224 to select given the optical communication path characteristic(s) 226.

The source coding module 208 is configured to encode the data 220 according to one or more of the encoding algorithm(s) 222. In one embodiment, the source coding module 208 retrieves the data 220 from the computer storage device 206 and applies a source coding algorithm as defined by one or more of the encoding algorithm(s) 222. In another embodiment, the source coding module 208 is preconfigured with a source coding to apply to the data 220. The output generated by the source coding module 208 is an encoded bitstream, which may be stored as part of the data 220 of the computer storage device 206. Additionally, and/or alternatively, the encoded bitstream may be communicated in real-time, or near real-time, to another module 210-216 of the optical transmitter 108, such as the ECC module 210 or channel model encoding module 212.

The ECC module 210 is configured to apply an error-correction coding to the encoded bitstream output by the source coding module 208. In some instances, the data 220 may not be encoded by the source coding module 208, in which case, the ECC module 210 applies the error-correction coding to data 220 that the ECC module 210 retrieves from the computer storage device 206. The resulting output from the ECC module 210 is one or more redundant bits that the optical receiver 110 may use to recover one or more information bits transmitted by the light source 218.

As discussed above, the channel model encoding module 212 is configured to select and apply a channel model 224 to the encoded bitstream and redundant bits to obtain a compressed and encoded bitstream that is eventually output by the light source 218. The channel model encoding module 212 may be configured to selectively apply the select channel model 224 to one or more portions of the encoded bitstream. The output from the channel model encoding module 212 is a compressed bitstream where repeated runs of binary characters in the encoded bitstream and/or redundant bits have been replaced with one or more binary characters, depending on the channel model used by the channel model encoding module 212. As explained above, the replacement one or more binary characters correspond to a transmission power level output by the light source 218.

In selecting a channel model 224, the channel model encoding module 212 may also select the channel model 224 according to the type of bits being compressed. For example, control bits may be considered more important than data bits, in which case, the channel model encoding module 212 is configured to select a channel model that has an bit-error rate having a value within a predetermined threshold for an bit-error rate of control bits. As another example, certain bits within the encoded bitstream may be designated as having a higher priority than other bits within the encoded bitstream, which signals to the channel model encoding module 212 that the higher priority bits are to be encoded with a channel model having a certain bit-error rate (e.g., an bit-error rate less than or equal to an bit-error rate associated with the priority value of the designated bits). In one embodiment, a two-dimensional table, array, matrix, or other data structure may be implemented that associates bit-error rates with specific types of bits (e.g., bits having a particular priority value, bits designated as control bits, etc.), and the channel model encoding module 212 is configured to reference this data structure in determining which of the channel model(s) 224 to select to compress the encoded bitstream.

In one embodiment, the compressed bitstream (including any redundant bits) is communicated to the baseband modulator/filter 214. The baseband modulator/filter 214 modulates a signal corresponding to the compressed bitstream with a carrier signal emitted by the light source 218. The baseband modulator/filter 124 may employ one or more modulation techniques to modulate the compressed bitstream with the carrier signal emitted by the light source 218. Examples of modulation techniques include, but are not limited to, quadrature phase shift keying (QPSK), binary phase shift keying (BPSK), phase-shift keying (PSK), quadrature amplitude modulation (QAM), amplitude- and phase-shift keying (APSK), and other such modulation techniques or combinations thereof. Further still, the carrier signal emitted by the light source 218 may be directly modulated by the baseband modulator/filter 214 wherein the light source 218 is configured to emit a carrier signal when a first binary character is encountered in the compressed bitstream (e.g., a binary "1") and configured to not emit the carrier signal when a second binary character is encountered in the compressed bitstream (e.g., a binary "0").

In addition, the baseband modulator/filter 214 may filter the modulated signal to be emitted by the light source 218 based on a desired wavelength. In one embodiment, the baseband modulator/filter 214 filters the modulated signal to be within a desired wavelength, such as 650 nm, 850 nm, 1300 nm, 1310 nm, and other such wavelengths. In some instances, the filter of the baseband modulator/filter 214 may be applied after the modulated signal has been up-converted to another frequency and/or wavelength. In this manner, the baseband modulator/filter 214 ensures that the signal emitted by the light source 218 is within a desired or selected wavelength.

In some instances, the baseband modulator/filter 214 may be applied to the compressed bitstream output by the channel model encoding module 212, such as where the compressed bitstream is to be transmitted with a carrier wave signal. In other instances, the channel model encoding module 212 may communicate the compressed bitstream to the light source 218, where the baseband modulator/filter 214 directly modulates the output of the light source 218.

The up-converting module 216 is configured to apply a frequency up-conversion technique to convert the frequency of the modulated signal (e.g., the modulated signal output by the baseband modulator/filter 214) to a higher or lower frequency to be emitted by the light source 218. In one embodiment, the up-converting module 216 is implemented as a finite impulse response (FIR) interpolator, a cascaded integrator-comb (CIC) compensator, and a CIC interpolator. The input to the up-converting module 216 includes the modulated signal output by the baseband modulator/filter 214 (e.g., the frequency of the modulated signal) and a local oscillator signal, where the output includes a new signal having a frequency within a particular range of a desired frequency (e.g., the sum of the two signals and/or the difference of the two signals). A bandpass filter (not shown) may then be applied to the output signal to select which of the two output signals is desired (e.g., the sum of the two signals or the difference of the two signals).

In some instances, the up-converting module 216 may be applied to the modulated signal where the modulated signal includes a radiofrequency (RF) signal at a lower frequency than desired. In other instances, the up-converting module 216 may be bypassed and the modulated signal may be communicated directly to the light source 218, such as where the modulated signal is within a range of a desired frequency.

The light source 218 is configured to emit a signal output by the channel model encoding module 212, the baseband modulator/filter 214, and/or the up-converting module 216. In one embodiment, emissions of the light source 218 are divided into transmission packets, where each transmission packet corresponds to a binary value within the compressed bitstream output by the channel model encoding module 212. In addition, each transmission packet may be associated with a particular power level such that the light source 218 emits a transmission packet at its associated power level. The light source 218 is further configured to emit the transmission packets at known time intervals (e.g., maintained by an internal clock circuit or the like), and an optical receiver (discussed with reference to FIG. 3) is configured to detect the transmission packets at the known time intervals. In this manner, the optical transmitter 108 is configured to emit transmission packets corresponding to the data 220 via one or more optical communication paths 116-118 and/or network 120.

In communicating the compressed bitstream to the optical receiver 110, the optical transmitter 108 may transmit a channel model identifier to the optical receiver 110 that identifies the channel model being used to compress the encoded bitstream. In one embodiment, a predetermined bit (or predetermined plurality of bits) of each transmission packet is/are designated as channel model identifier bit(s), and the optical receiver 110 is configured to read the predetermined channel model identifier bit(s) to determine the correct channel model to apply to decompress the compressed bitstream. In another embodiment, the optical transmitter 108 and the optical receiver 110 operate according to a predetermined schedule for applying the channel models, and the optical receiver 110 selects the channel model to apply based on this predetermined schedule. In this scheduling embodiment, a channel model may be associated with a day, time, or other increment of time, and the optical transmitter 108 and the optical receiver 110 select the corresponding channel model based on this predetermined schedule.

Figure 3:
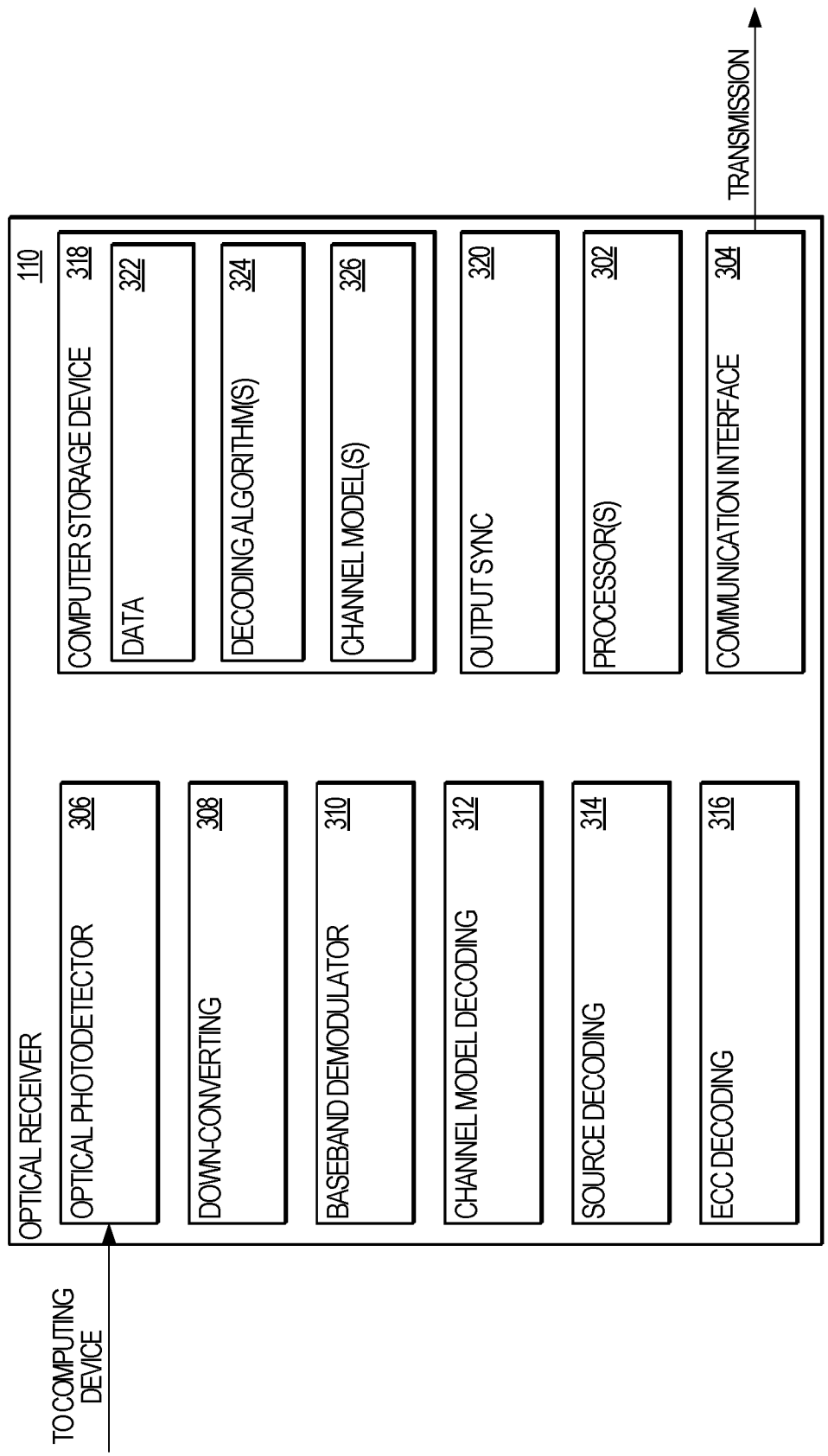
FIG. 3 illustrates the optical receiver of FIG. 1 according to an example embodiment.

FIG. 3 illustrates components of the optical receiver 110 shown in FIG. 1, according to an example embodiment. As shown in FIG. 3, and in one embodiment, the optical receiver 110 includes various components 302-318. These components 302-318 include, but are not limited to, one or more processor(s) 302, a communication interface 304, an optical photodetector 306, a baseband demodulator 308, and a channel model decoding module 312. The components 302-318 further include an ECC decoding module 316, a source decoding module 314, a computer storage device 318, and an output sync 320.

The various component 302-318 of the optical receiver 110 may be implemented in a single device or may be distributed across several devices in various arrangements. The various components 302-318 of the optical receiver 110 may access one or more computer storage devices for configuration information and/or implementation algorithms, and each of the various components 302-318 may be in communication with one another (e.g., via one or more communication buses or the like). Further, while the components 302-318 of FIG. 3 are discussed in the singular sense, it will be appreciated that in other embodiments multiple instances of the components 302-318 may be employed.

One or more of the components 306-318 may be implemented in hardware and/or software. In one embodiment, the components 306-318 are implemented as dedicated circuits, such as Application Specific Integrated Circuits (ASICs) where the dedicated circuits are configured to perform predetermined functions. For example, the source decoding module 314 may be implemented as an ASIC configured to perform Huffman decoding on the decompressed bitstream obtained by the channel model decoding module 312. As another example, the ECC decoding module 316 may be implemented as an ASIC configured to decode the compressed bitstream using Reed Solomon codes. Additionally, and/or alternatively, the components 306-318 may be implemented as software, where the processor(s 302 are configured to execute computer-readable instructions that implement the components 306-318. Furthermore, combinations of the foregoing are possible, where some modules are implemented as dedicated circuits and other modules are implemented in software. In this manner, the optical receiver 110 may include components 306-318 that are implemented in hardware and/or software.

The communication interface 304 is configured to communicate with the computing device 106 and/or the network 120. In this regard, communication with the computing device 106 includes receiving data from the computing device 106 and/or sending data to the computing device 106. The optical receiver 110 may also receive instructions and/or configurations from the computing device 106 via the communication interface 304. For example, the optical receiver 110 may receive data 322, one or more decoding algorithm(s) 324, and one or more detection model(s) 326 from the computing device 106.

The communication interface 304 may include one or more wired and/or wireless communication interfaces. For example, the communication interface 304 may include a wireless transceiver, a Bluetooth® radio, and/or a wired network interface. In one embodiment, the communication interface 304 is configured to establish a wireless communication channel with the computing device 106 using one or more wireless communication protocols such as 802.11 b/g/n. Additionally, and/or alternatively, the optical receiver 110 may establish a communication channel with the computing device 106 via a wire or other physical medium (e.g., via an Ethernet cable or the like). In yet another embodiment, the communication interface 202 is a local bus, which allows direct communication between the optical receiver 110 and the computing device 106.

The processor(s) 302 are configured to execute computer-readable instructions that implement one or more of the modules 306-318. Additionally, and/or alternatively, the processor(s) 302 may be configured to retrieve computer-readable instructions from the computer storage device 318. The one or more processor(s) 302 may be any type of commercially available processor, such as processors available from the Intel Corporation, Advanced Micro Devices, Texas Instruments, or other such processors. Further still, the one or more processor(s) 302 may include one or more special-purpose processors, such as a Field-Programmable Gate Array (FPGA) or an Application Specific Integrated Circuit (ASIC). The one or more processor(s) 302 may also include programmable logic or circuitry that is temporarily configured by software to perform certain operations. Thus, once configured by such software, the one or more processor(s) 302 become specific machines (or specific components of a machine) uniquely tailored to perform the configured functions and are no longer general-purpose processor(s) 302.

Where the one or more processor(s) 302 implement the modules 306-318 via one or more computer-readable instructions, the computer-readable instructions may be written in one or more computer-programming and/or computer-scripting languages. Examples of such languages include, but are not limited to, C, C++, C #, Java, JavaScript, Perl, Python, or any other computer programming and/or scripting language now known or later developed.

The optical receiver 110 may further include various computer storage device(s) 316 and/or computer-readable medium(s) for storing data 322, decoding algorithm(s) 324, and/or one or more detection model(s) 326. The computer storage device 318 includes one or more physical devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer storage device" should be taken to include a single device or multiple devices (e.g., a centralized or distributed database, or associated caches and servers) able to store the data 322, the one or more decoding algorithm(s) 324, and/or the detection model(s) 326. Accordingly, the computer storage device 318 may be implemented as a single storage apparatus or device, or, alternatively and/or additionally, as "cloud-based" storage systems or storage networks that include multiple storage apparatus or devices.

The data 322 of the computer storage device 318 includes information received from the computing device 104 via the optical transmitter 108. The data 322 may also include computer-readable instructions that configure the one or more processor(s) 302 to implement one or more of the modules 306-318.

The decoding algorithm(s) 324 include one or more algorithms for decoding the bitstream received from the computing device 104. In one embodiment, the decoding algorithm(s) 324 include one or more source decoding algorithms that are implemented by the source decoding module 314. Examples of source decoding algorithms that may be included in the decoding algorithm(s) 324 include Huffman decoding, Lempel-Ziv decoding, Shannon-Fano decoding, and other such decoding algorithms or combinations thereof.

In another embodiment, the decoding algorithm(s) 324 include one or more error-correction decoding algorithms for decoding one or more redundant bits included in the bitstream transmitted by the optical transmitter 108. Where the ECC decoding module 316 is implemented in hardware, the ECC decoding module 316 310 may be configured to reference a memory address of the computer storage device 318 to retrieve the error-control decoding algorithm to apply to the received bitstream and its included redundant bits. Alternatively, the ECC decoding module 316 may reference a variable name, which may store a variable value or a constant value, where the value referenced by the variable name indicates the error-control decoding algorithm to apply. The error-control decoding algorithms applicable by the ECC decoding module 316 may include, but are not limited to, Hamming codes, Reed-Solomon codes, and other such error-correction coding techniques, or combinations thereof.

The channel model(s) 326 include one or more channel model(s) that define power-based decompression algorithms for the channel model decoding module 312. As explained with reference to FIG. 2, the channel model(s) 326 map particular power levels detectable by the optical receiver 110 with runs of a repeated binary character within the transmitted bitstream. In one embodiment, the transmitted bitstream includes an identifier (e.g., a particular value) that signals to the channel model decoding module 312 the channel model 326 that was used to compress the transmitted bitstream. By using the transmitted identifier, the channel model decoding module 312 selects the appropriate channel model(s) 326 to use in decompressing the transmitted bitstream.

In some instances, the transmission from the optical transmitter 108 may need to be down-converted and/or demodulated from a carrier signal. Accordingly, the down-converting module 308 is configured to down-convert the transmission signal from the optical transmitter 108. In one embodiment, the down-converting module 308 is implemented as a digital down-converter and includes a mixer, a CIC decimator, and one or more FIR filters. The inputs to the down-converting module 308 includes the received transmission from the optical transmitter 108 and a local oscillator to compute the intermediate frequency (e.g., the frequency that is output by the down-converting module 308).

In addition, depending on whether the transmission signal has been modulated with a carrier signal, the output from the down-converting module 308 (or the optical photodetector 306) is communicated to a baseband demodulator module 310. The baseband demodulator module 310 demodulates the transmission from the optical transmitter 108 to obtain a compressed bitstream representing data having been compressed by a power-based compression algorithm. The baseband demodulator/module 310 may employ one or more demodulation techniques to demodulate the transmission signal. Examples of demodulation techniques include, but are not limited to, quadrature phase shift keying (QPSK), binary phase shift keying (BPSK), phase-shift keying (PSK), quadrature amplitude demodulation, amplitude- and phase-shift keying (APSK), and other such demodulation techniques or combinations thereof.

In some instances, the down-converting module 308 and/or baseband demodulator 310 may be bypassed by the optical photodetector 306. For example, the processor(s) 302 may determine that the transmission signal has not been upconverted or that the transmission signal has not been externally modulated. In these situations, the optical photodetector 306 may communicate one or more identified transmission packets to the channel model decoding module 312 for decompression.

The channel model decoding module 312 is configured to decompress the compressed bitstream down-converted by the down-converting module 308. In one embodiment, the channel model decoding module 312 selects a channel model from the channel model(s) 326 to apply to the down-converted bitstream to obtain an uncompressed bitstream. In one embodiment, the channel model decoding module 312 selects the channel model according to a channel model identifier included in a predetermined bit of a transmission packet sent by the optical transmitter 108. As discussed previously, the optical transmitter 108 and the optical receiver 110 may be programmed to recognize a particular bit (or bits) within a transmission packet as a channel model identifier bit where the channel model identifier bit identifies the channel model used to compress the particular transmission packet being sent. The optical transmitter 108 and the optical receiver 110 may each have a copy of the channel model(s) that can be used, where an identifier is associated with each of the channel model(s). In this manner, when a transmission packet is received, the optical receiver 110 is configured to examine a first bit (or a first set of bits) to determine the channel model used to compress the transmission packet, and then decompresses the payload of the transmission packet according to the channel model identified by the channel model identifier. After a transmission packet is decompressed by the channel model decoding module 312, the decompressed transmission packet is communicated to the source decoding module 314.

The source decoding module 314 is configured to decode the uncompressed bitstream, obtained by the channel model decoding module 312, according to one or more of the decoding algorithm(s) 324. In one embodiment, the source decoding module 310 receives the uncompressed bitstream 310 from the channel model decoding module 312 and, from the manner in which the uncompressed bitstream is coded, determines which decoding algorithm to apply to the uncompressed bitstream. In another embodiment, the source decoding module 310 is preconfigured with the decoding algorithm to apply to the uncompressed bitstream. For example, the optical receiver 110 and/or the optical transmitter 108 may be configured to apply a source encoding and source decoding algorithm using a shared secret key. The output generated by the source decoding module 314 is a decoded bitstream, which may be stored as part of the data 322 of the computer storage device 318. Additionally, and/or alternatively, the decoded bitstream may be communicated in real-time, or near real-time, to another module 306-318 of the optical receiver 110, such as the ECC decoding module 316.

The ECC decoding module 316 is configured to apply an ECC decoding algorithm to the decoded bitstream output by the source decoding module 314. In some instances, a source coding may not have been applied to the decompressed bitstream, in which case, the ECC decoding module 316 applies the ECC decoding algorithm to the decompressed bitstream obtained by the channel model decoding module 312. In applying the ECC decoding algorithm, the ECC decoding module 316 determines whether there are errors in one or more bits of the decompressed bitstream. Where there are errors, the ECC decoding module 316 corrects the bitstream accordingly. In some instances, the ECC decoding module 316 may request that the optical receiver 110 request a re-transmission of a transmission packet corresponding to the bit having the error. In other instances, the ECC decoding module 316 corrects the bit using the redundant bits that are included with the decompressed bitstream. In this way, the optical receiver 110 can correct for one or more errors that may occur in the bitstream transmitted by the optical transmitter 108.

The output sync 320 is configured to synchronize the output generated by the optical photodetector 306. In one embodiment, the output sync 320 sends timing information to the optical photodetector 306 to ensure that the optical photodetector 306 captures transmission packets at predetermined time intervals. In another embodiment, the output sync 320 may communicate with the processor(s) 302 to ensure that the processor(s) 302 use the correct timing information in determining whether a plurality of photons corresponds to a transmission packet based on one or more of the detection model(s) 326.

After a transmission packet has been decoded and error-corrected (if applicable), the transmission packet may be stored in the computer storage device 318. In one embodiment, the transmission packets are stored in Random Access Memory (RAM) until a predetermined number of transmission packets have been received and decoded by the optical receiver 110. When the predetermined number of transmission packets have been received, a block of data representing the transmission packets may be communicated to the computing device 106 via the communication interface 304.

Figure 4:
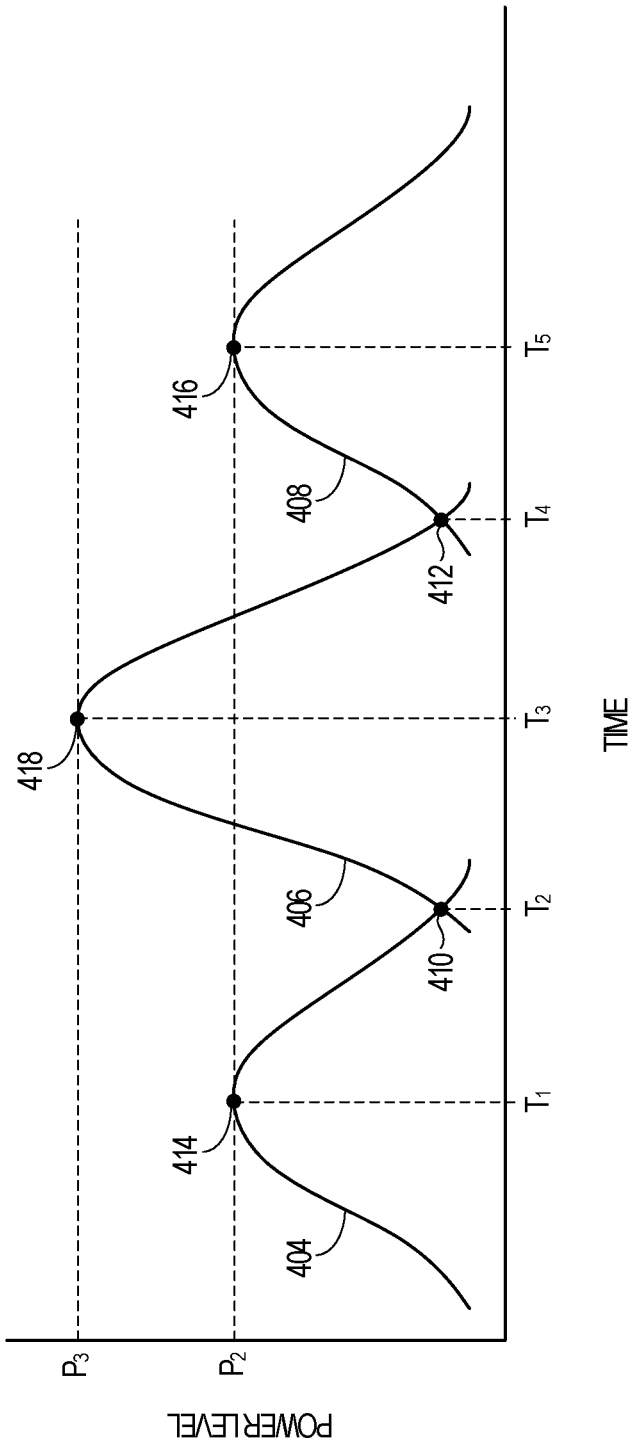
FIG. 4 illustrates a distribution of photons detected by the optical receiver of FIG. 1, where the distribution corresponds to a transmission signal having been compressed using a selected channel model, according to an example embodiment.

FIG. 4 illustrates a distribution 402 of photons detected by the optical receiver 108 of FIG. 1, where the distribution 402 corresponds to a transmission signal having been compressed using a first power-based compression algorithm, according to an example embodiment.

With reference to FIGS. 2-3, the optical transmitter 108 has been tasked with compressing a first encoded bitstream of "1 1 0 1 1 1 0 1 1". In this example, the optical transmitter 108, via the channel model encoding module 212, has applied a channel model 242 that utilizes a maximum number of sequential repeated values of at least three, with power levels $P_0$ mapped to '0', $P_1$ mapped to "1", $P_2$ mapped to "1 1", $P_3$ mapped to "1 1 1" and so on. The channel model may define the precise power levels of $P_0$-$P_3$ or may define the range of the transmitter's power level and specify that the power levels are evenly spaced. The transmitter thus compresses the transmission into five (5) transmission packets, where each transmission packet is transmitted at a predetermined time period (e.g., $T_1$, $T_3$, and $T_5$).

Accordingly, subsequent runs of the binary character are transmitted as a single binary character having a transmission power level that is correlated to the number of binary characters in the run. In other words, under this channel model a run of two (2) binary characters is associated with a single binary character having a $P_2$ transmission power, a run of three (3) binary characters is associated with a single binary character having a $P_3$ transmission power, and so forth. In some instances, the successive runs of repeating binary characters are mapped to varying power levels, where each power level is a different power level. In these instances, the power levels may be successive power levels; in other instances, the power levels may be arbitrary and/or randomly assigned.

Where a 0 is encountered in the encoded bitstream, the channel model encoding module 212 may determine that no power, or minimal power, by the light source 218 is to be emitted. While in FIG. 4, successive runs of binary '1's are shown as being transmitted at successively increasing power levels, in other examples, other mappings between different run-lengths of binary '1's may be used. For example, $P_2$ may represent "1 1 1" and $P_3$ may represent "1 1". As another example, $P_3$ may represent "1" and $P_2$ may represent "1 1" and $P_3$ may represent "1".

Accordingly, when the optical receiver 110 detects the transmission from the optical transmitter 108, the distribution 402 is encountered. In the distribution 402, there are intermediate distributions of detected photons 404-408 having a range of transmission power levels and there are a greater (e.g., a threshold) number of detected photons 414-418 having a transmission power level of $P_2$ or $P_3$, where $P_2$ and $P_3$ are a combination of the minimum detectable power level P, and $P_3$ is greater than $P_2$. In this regard, a first group of photons 414 is transmitted at time period $T_1$ having a transmission power level $P_2$, a second group of photons 418 is transmitted at time period $T_2$ having a transmission power level $P_3$, and a third group of photons 416 is transmitted at time period $T_3$ having a transmission power level $P_2$. As shown in FIG. 4, there are two time periods, time period $T_2$ and time period $T_4$, where a minimal number of photons 410-412 are transmitted and/or detected. Using one or more of the channel model(s) 326, the optical receiver 110 may assign the first group of detected photons 414 as a first transmission, the second group of detected photons 418 as a second transmission, and a third group of photons 416 as a third transmission. Then, using the channel models(s) 326, the channel model decoding module 312 determines that the first transmission packet corresponds to two (2) binary 1s, that the second transmission packet corresponds to three (3) binary 1s, and that the third transmission packet corresponds to two (2) binary 1s. This decompressed portion of the transmitted bitstream may then be stored in the computer storage device 318 for later retrieval, or the it may be communicated to the source decoding module 314 for further decoding.

Figure 5:
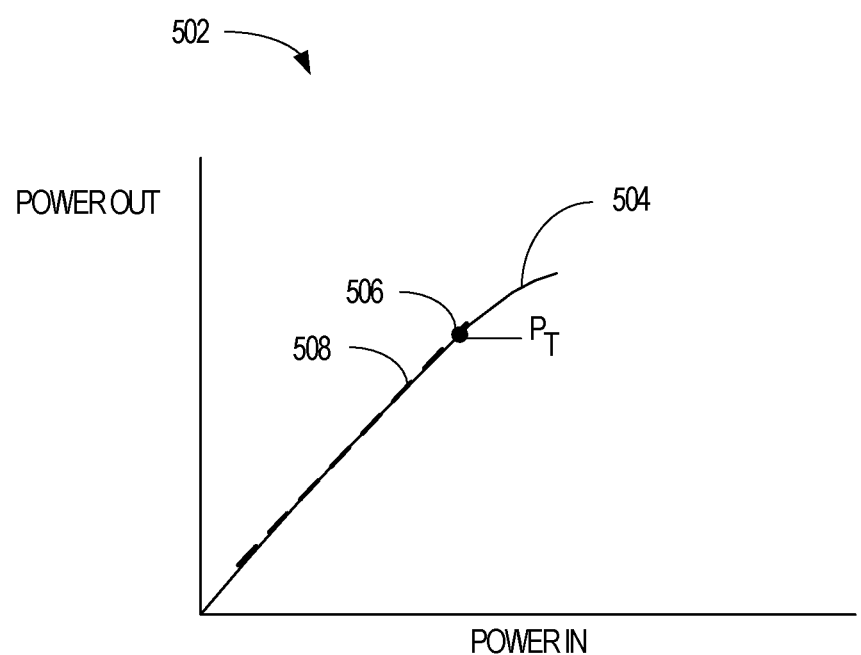
FIG. 5 illustrates a graph, in accordance with an example embodiment, of power efficiency of an optical transmitter given a particular input power.

FIG. 5 illustrates a graph 502, in accordance with an example embodiment, of power efficiency of the optical transmitter 108 of FIG. 2 given a particular input power. As shown in FIG. 5, given a particular input power, the optical transmitter 108 outputs a corresponding output power. The line 504 illustrates an example relationship between the input power and the output power. In some instances, the relationship between the input power and the output power is a diminishing marginal relationship where, after a particular input power (or a range of input powers), subsequent increases of the input power do not lead to the same increase (or better) increase of the output power. As shown in FIG. 5, the increase in output power for a given input power decreases at around $P_T$ (e.g., reference number 506), where $P_T$ is based on the characteristics and/or particularities of the optical transmitter 108. In one embodiment, $P_T$ is empirically determined, where output power of the optical transmitter 108 is measured at predetermined intervals of a given input power. Thus, $P_T$ is determinable for the optical transmitter 108 being used to transmit data to one or more optical receivers (e.g., optical receiver 110).

In addition to line 504, graph 502 illustrates a line 508, which illustrates a linear relationship (or substantially linear relationship with minor deviations), between the input power and the output power of the optical transmitter 108. The line 508 illustrates that the power efficiency for an optical transmitter, such as the transmitter 108, can be linear, or close to linear up until an output power threshold designated by point $P_T$. As discussed below with reference to FIGS. 6A-6C, the implementation of one or more channel models for encoding and transmitting a bitstream leverages the linear relationship illustrated by the line 508, such that the maximum output power for a particular channel model is point $P_T$. Where more than one channel models are implemented for a particular optical transmitter, each of the channel models may be configured or designed such that the maximum output power assigned to a particular sequence of same bit values does not exceed the output power threshold $P_T$.

Figure 6A:
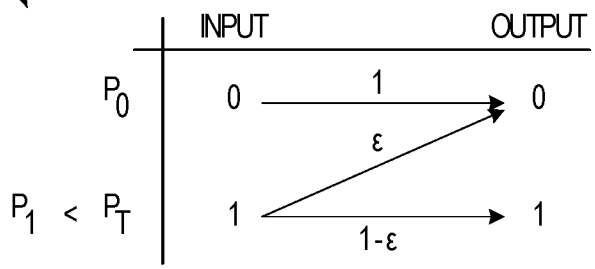
FIGS. 6A-6C illustrate various channel models, in accordance with example embodiments, for encoding an input bitstream given a particular sequence of same bit values and the potential output errors that may occur for each of the channel models.
Figure 6B:
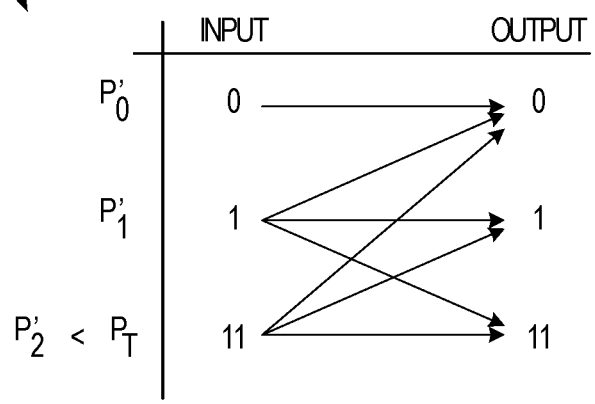
Figure 6C:
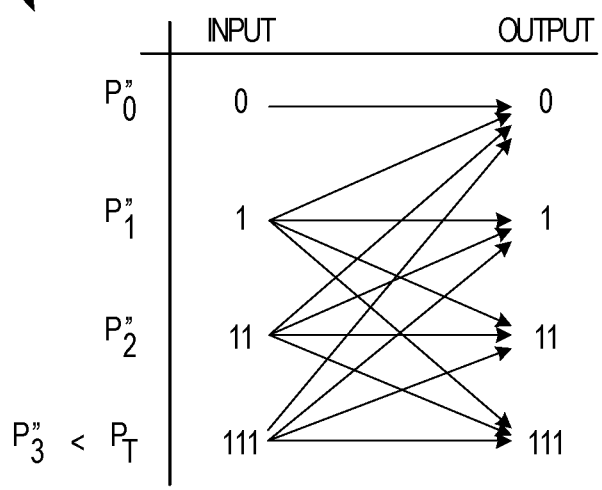

Referring to FIGS. 6A-6C are various channel models 602A-602C, in accordance with example embodiments, for encoding an input bitstream given a particular sequence of same bit values and the potential output errors that may occur for each of the channel models. The channel models 602A-602C may correspond to the channel model(s) 224 and channel model(s) 326 stored by the optical transmitter 108 and the optical receiver 110, respectively. FIG. 6A represents a first channel model 602A (e.g., "channel model 1"), FIG. 6B represents a second channel model 602B (e.g., "channel model 2"), and FIG. 6C represents a third channel model 602C (e.g., "channel model 3"). The first channel model 602A represents a base or primary channel model, where the bit value of "0" is assigned a first power level and the bit value of "1" is assigned a second power level. This channel does not allow for power-based compression. The second and third channel models 602B-602C differ from the first channel model 602A in that, for the second and third channel models 602B-602C, a transmission power level is mapped to a particular sequence of repeated, same bit values. For example, with the second channel model 602B, a transmission power level of $P_2'$ is mapped to a bit value sequence of "11." In the channel model 602B other repeated sequences are not represented specifically but can be represented by repeated transmissions—thus '1 1 1 1' may be represented by two transmissions of '1' at power level $P_2'$. The third channel model 602C, includes transmission power levels of $P_2''$ and $P_3''$ mapped to a bit value sequence of "11" and "111," respectively. As with the second channel model, additional repeated '1' values may be represented by successive transmissions of '1' values at various power levels, for example a sequence of "11111" may be represented as a '1' transmitted at $P_2''$ and a '1' transmitted at $P_3''$.

As explained above with reference to FIG. 5, the optical transmitter using the channel models 602A-602C may have a transmission power level threshold, $P_T$, where the efficiency between an input power level and an output power level becomes non-linear. Accordingly, the transmission power levels shown in FIGS. 6A-6C may be less than or equal to the transmission power level threshold $P_T$. Further still, the transmission power level corresponding to a particular bit value in one channel model may be different than the transmission power level corresponding to the particular bit value in another channel model. For example, the transmission power level $P_1$ of the first channel model 602A may be greater than the transmission power level $P_1'$ of the second channel model 602B. Although these two transmission power levels are mapped to the same bit value, "1," these two transmission power levels may be different because the second channel model 602B employs additional transmission power levels to represent additional sequences of repeating bit values (e.g., "11"). Similarly, the transmission power level $P_2''$ of the third channel model 602C may be different from the transmission power level $P_2'$ of the second channel model 602B even though these transmission power levels correspond to the same repeating sequence of bit values, namely, "11".

In addition to illustrating the various power levels that the channel models 602A-602C map to particular bit values and sequences of bit values, the channel models 602A-602C also illustrate the potential errors that may arise in the transmission of a particular sequence given a particular power level. For example, the first channel model 602A illustrates that an input bit value of "1" may be interpreted as a "0" at an error rate c, while it the input bit value of "1" may be interpreted as a "1" at a success rate of (1−ε). Similarly, the second channel model 602B illustrates that an input bit value of "1" may be interpreted incorrectly as a "0" or "11," and that the input sequence of bit values of "11" may be interpreted incorrectly as a "0" or a "1." The third channel model 602C also illustrates similar errors may be experienced in the transmission of a particular bit value or a sequence of bit values given a particular transmission power level.

The causes of the errors in interpreting the transmission from the optical transmission include various optical channel characteristics, transmitter characteristics, receiver characteristics, and other such characteristics. For example, with regard to the optical channel characteristics, the distance between the transmitter and the receiver may be such that the light attenuation of the transmission exceeds the ability of the receiver to interpret the transmission at its particular transmission power level. With regard to transmitter characteristics, one example of a transmitter characteristic is laser degradation, where a laser of the optical transmitter may have degraded such that the actual transmission power level output by the optical transmitter is less than the transmission power level requested by the optical transmitter. With regard to receiver characteristics, one example of a receiver characteristic is photodiode degradation, where a photosensor or other photodiode of the optical receiver 110 has degraded such that the transmission power level detected by the receiver is different than the transmission power level output by the optical transmitter.

To accommodate errors in the transmitted bitstream, the optical transmitter 108 may leverage error correction codes to help the receiver 110 identify and/or determine errors in the received transmission. For example, the source decoding module 314 may determine whether an error in the bitstream occurred. Accordingly, where the source decoding module 314 determines that the received bitstream includes one or more errors, the optical receiver 110 may communicate a message to the computing device 106 that an error was detected and/or determined in the received bitstream. In turn, the computing device 106 may assemble and/or generate a message for transmission to the computing device 104 via the optical transmitter 114 and the optical receiver 112 that an error was detected and/or determined. In another embodiment, the optical receiver 110 (or computing device 106) determines an error rate in the received bitstream, and communicates the determined error rate periodically (e.g., a predetermined time intervals) to the computing device 104 via the optical transmitter 114 and the optical receiver 112. In other examples, errors may be presumed from the presence of retransmission requests from the optical transmitter 114.

The determined error rate may be determined by computing a ratio of the number of errors in the received bitstream vs. the total number of interpreted bit values from the received bitstream. However, the error rate may be determined using other methods or implementations and such methods and implementations are contemplated as falling within the scope of this disclosure. In some instances, the computing device 104 (or optical transmitter 108) determines the error rate given the error messages and/or notifications communicated by the computing device 106.

To manage the errors that may occur in a transmitted bitstream, the optical transmitter 108 may implement a bit-error rate threshold that indicates when an unacceptable number of errors have occurred in the transmitted bitstream. Based on a determination that the bit-error rate meets or exceeds the bit-error rate threshold, the optical transmitter 108 may adaptively change the channel model being used to communicate the input bitstream. For example, during transmission of a bitstream using the third channel model 602C, the optical transmitter 108 may receive a message or instruction from the computing device 104 indicating a particular bit-error rate that meets or exceeds the bit-error rate threshold. In response, the optical transmitter 108 may switch to a channel model that is less prone to errors, such as the first channel model 602A or the second channel model 602B. The first channel model 602A and the second channel model 602B may be considered less error prone because the possibility of interpreting an input bit value as a different bit value using the first or second channel models 602A-B is less than the possibility of the input bit value being interpreted as a different bit value using the third channel model 602C. In this manner, the optical transmitter 108 may switch from one channel model to a different channel model in response to a notification from the computing device 104. Being able to adaptively change the channel model used to communicate the input bitstream improves the functioning of the optical transmitter 108 as it allows the optical transmitter 108 to reduce the bit-error rate of the transmitted bitstream. Such an improvement in the field of optical communications would not be possible if the optical transmitter 108 only had one channel model by which to communicate the input bitstream.

Additionally, and/or alternatively, the optical transmitter 108 may adaptively change the channel model in response to a determination that the bit-error rate is less than the bit-error rate threshold. The bit-error rate being less than the bit-error rate threshold may indicate that equipment and/or transmission medium being used to transmit the bitstream can accommodate a channel model that further compress an input bitstream than the channel model currently being used. For example, where the optical transmitter 108 is using the second channel model 602B to transmit an input bitstream, the optical transmitter 108 may receive a message or instruction from the computing device 104 that the bit-error rate is less than the bit-error rate threshold. Accordingly, the optical transmitter 108 may switch from using the second channel model 602B to transmit the input bitstream to the third channel model 602C to transmit the input bitstream.

In some embodiments, the optical transmitter 108 may implement a lower bit-error rate threshold and an upper bit rate threshold that indicate whether the optical transmitter 108 should switch the channel model being used. The lower bit rate threshold may correspond to switching from a channel model that is less error prone (e.g., has few mappings of transmission power levels) to a channel model that is more error prone (e.g., has more mappings of transmission power levels). The upper bit rate threshold may correspond to switching from a channel model that is more error prone (e.g., has more mappings of transmission power levels) to a channel model that is less error prone (e.g., has fewer mappings of transmission power levels).

In addition to the use of an bit-error rate (upper and/or lower), the optical transmitter 108 may adaptively switch the channel model being used based on characteristics of the data that is transmitted. For example, control data may be considered more important than user data. Accordingly, the bits that make up the control data may be communicated using a channel model that is less prone to errors (e.g., a channel model having a bit error rate that is less than or equal to an bit-error rate threshold associated with control data) in the bitstream transmission (e.g., the first channel model 602A). In one embodiment, the optical transmitter 108 may implement a chart, two-dimensional table, array, or other data structure that maps the type of bits being transmitted to one or more corresponding channel models for transmitting the bits. Thus, control bits may be mapped to using the first channel model 602A or the second channel model 602B, whereas data bits may be mapped to using the first, second, or third channel models 602A-602C. In similar fashion, a priority level (e.g., Quality of Service) of the bits in the bitstream may be mapped to one or more of the channel models 602A-602C. In this manner, the type of bits being transmitted, or the priority of the bits being transmitted, may signal to the optical transmitter 108 as to which channel model should be used to transmit the bits.

Figure 7A:
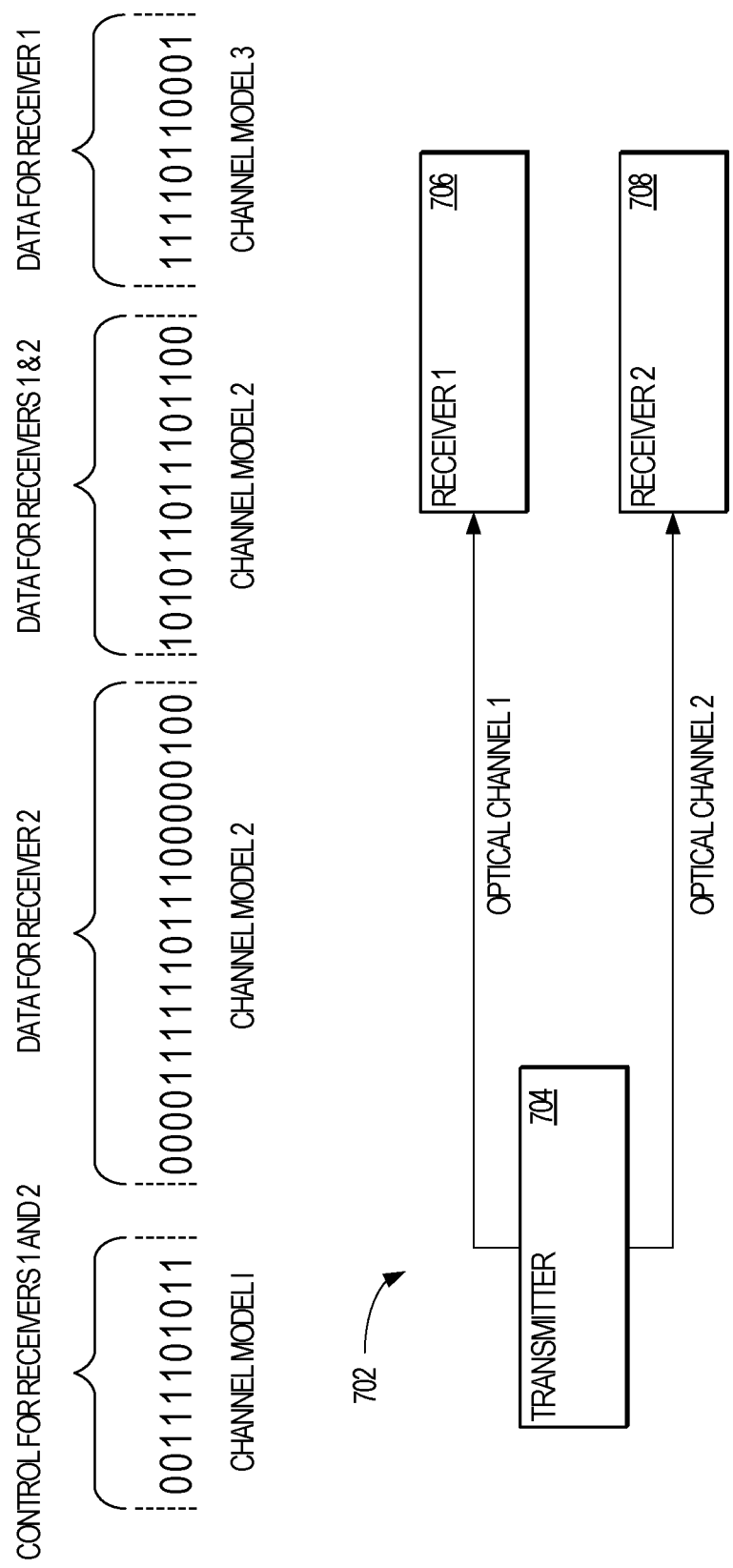
FIGS. 7A-7B illustrate a transmitter communicating an input bitstream to different receivers, according to an example embodiment, where an adaptive channel model approach is employed to maintain the integrity of the received bitstream.
Figure 7B:
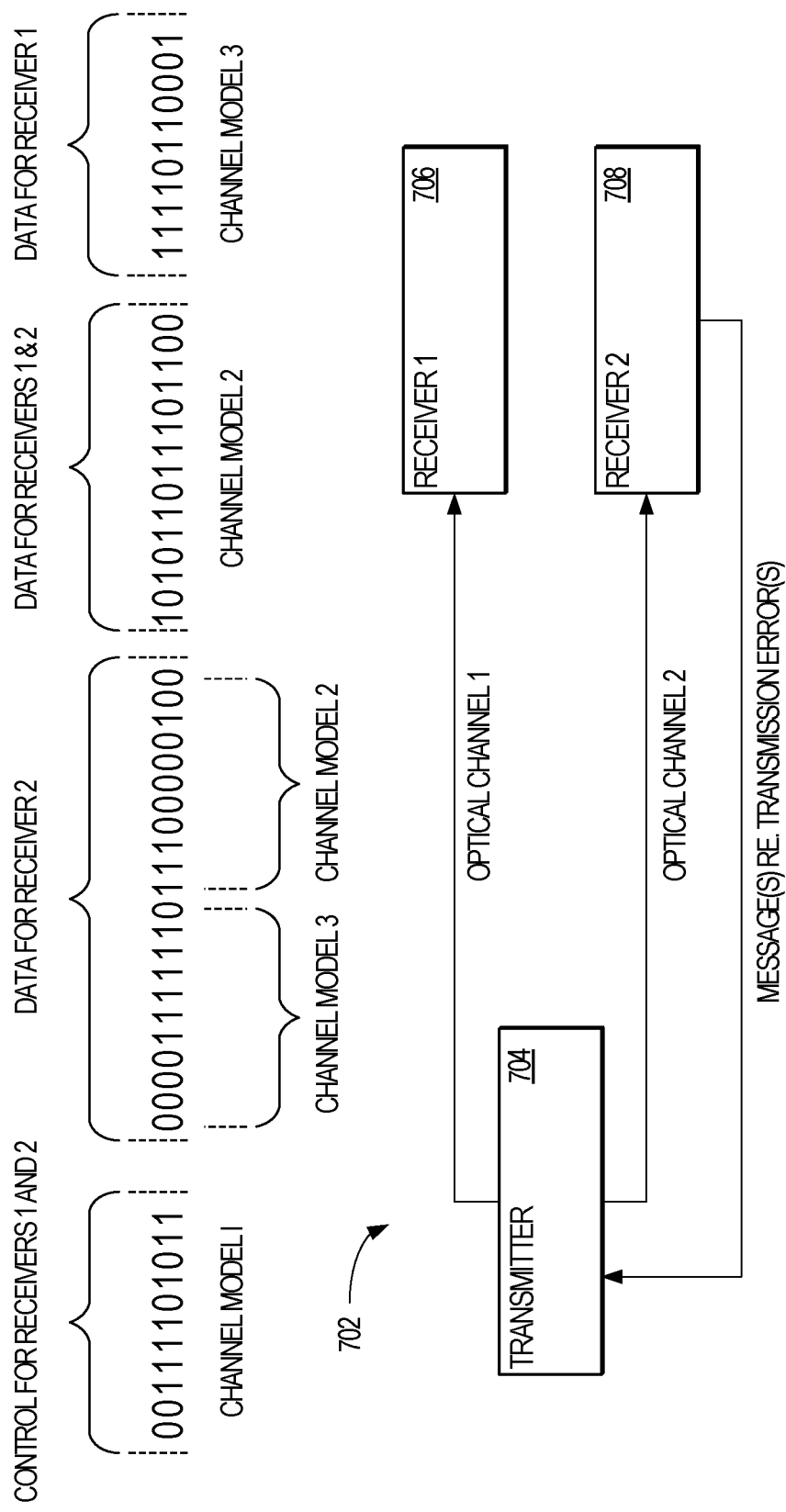

In some examples, a single transmitter may transmit to multiple receivers and the single transmitter may utilize different channel models for transmissions for different receivers. FIGS. 7A-7B illustrate a communication system 702 having a transmitter 704 communicating an input bitstream to different receivers 706-708, according to an example embodiment, where an adaptive channel model approach is employed to maintain the integrity of the received bitstream. The optical transmitter 704 and the optical receivers 706-708 may include the same, additional, and/or alternative components as the optical transmitter 108 and the optical receiver 110 as shown in FIGS. 2-3, respectively.

As shown in FIG. 7A, the optical transmitter 704 uses the first channel model 602A to communicate control bits to the first receiver 706 and the second receiver 708. The optical transmitter 704 then uses the second channel model 602B to communicate data bits to the second receiver 708, and then uses the second channel model 602B again to communicate data bits to the first receiver 706 and the second receiver 708. Finally, the optical transmitter 704 uses the third channel model 602C to communicate a set of data bits to the first receiver 706.

Although not shown explicitly, the first receiver 706 and the second receiver 708 may also include an optical transmitter for communicating with the optical transmitter 704, and the optical transmitter 704 may include an optical receiver for receiving communications from the first receiver 706 and the second receiver 708.

As discussed above, the optical receiver 706 and/or the optical receiver 708 may detect errors in the received bitstream and may communicate a message to the optical transmitter 704 indicating that one or more errors were detected or that a particular bit-error rate was determined.

Referring to FIG. 7B, the transmitter 704 is communicating a bitstream to the first and second receivers 706-708, but initially uses the third channel model 602C to communicate a first set of data bits to the second receiver 708. Having received a portion of the bitstream, the second receiver 708 has detected errors in the bitstream, and has communicated a message to the optical transmitter 704 indicating that an error was detected and/or a determined bit-error rate. Accordingly, the optical transmitter 704 switches the channel model being used to communicate the bitstream from the third channel model 602C to the second channel model 602B. Thus, the optical transmitter 704 transmits the remaining portion of the first data bits to the second receiver 708 using the second channel model 602B.

Figure 8:
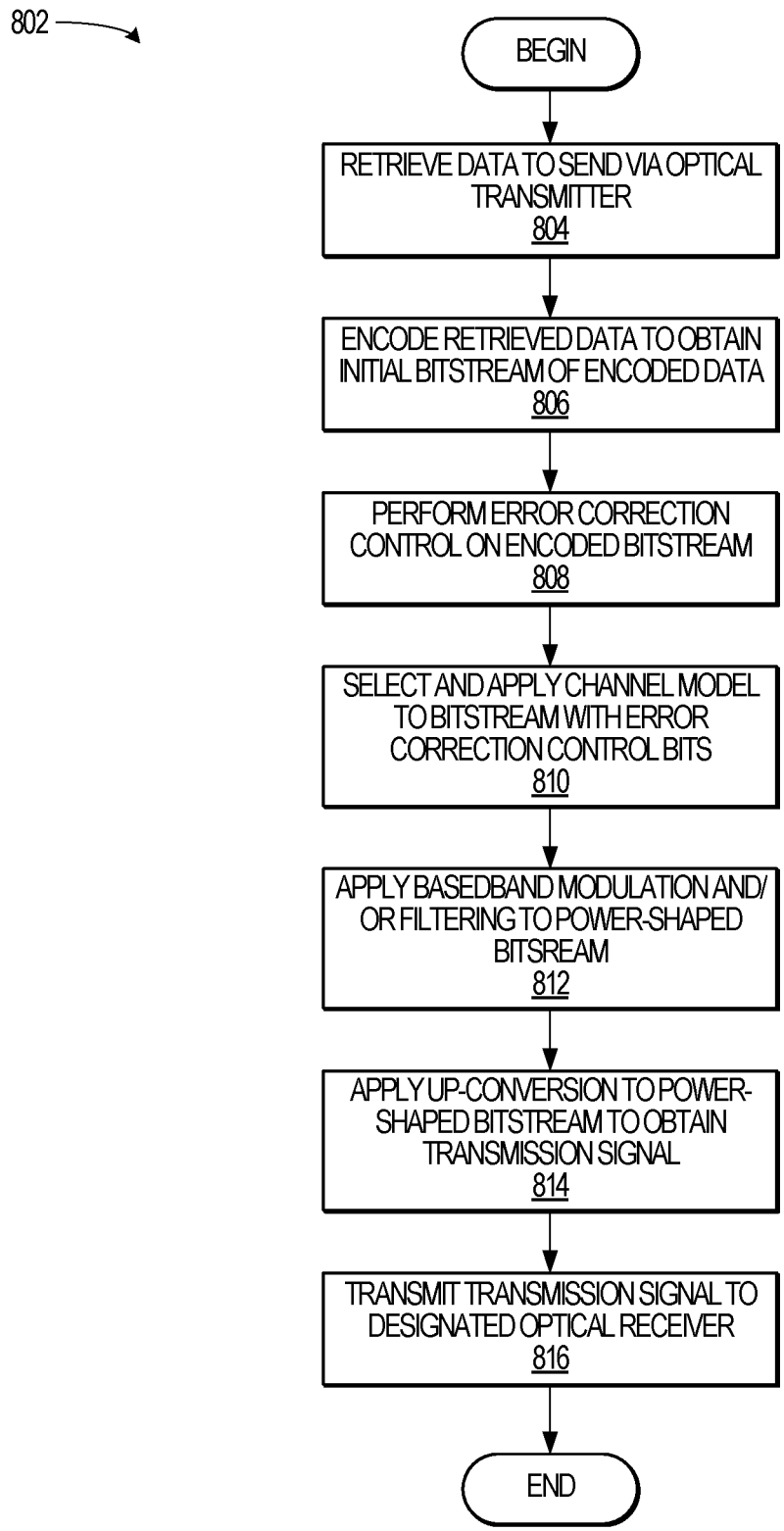
FIG. 8 illustrates a method, in accordance with an example embodiment, for transmitting an encoded bitstream using the optical transmitter of FIG. 1.

FIG. 8 illustrates a method 802, in accordance with an example embodiment, for transmitting an encoded bitstream using the optical transmitter 108 of FIG. 1. The method 802 may be performed by one or more of the components illustrated in FIGS. 2-3, and is discussed by way of reference thereto.

Initially, the optical transmitter 108 is instructed to send data 220 via the light source 218 through the one or more optical paths 116-118 and/or the network 120 (Operation 804). Thereafter, the source coding module 208 applies a source coding algorithm (using one or more of the encoding algorithm(s) 222) to the data 220 to obtain an encoded bitstream (Operation 806). The source coding module may then communicate the encoded bitstream to the ECC module 210 for applying an ECC algorithm to the encoded bitstream using one or more of the encoding algorithm(s) 222 (Operation 808). In some instances, Operation 806 and/or Operation 808 may be omitted or bypassed, such as where no source coding is to be applied or where ECC is not to be applied to the bitstream.

After the ECC module 210 has completed its operations, the ECC module 210 may then invoke the channel model encoding module 212 to select a particular channel model 224 and apply a power-based compression algorithm to the encoded bitstream and redundant bits (Operation 810). In one embodiment, the channel model encoding module 212 is instructed to select which channel model 224 to apply, such as by receiving an instruction from the computing device 104.

In another embodiment, the channel model encoding module 212 automatically selects which channel model 224 to apply. For example, the channel model encoding module 212 may automatically select a channel model 224 to apply based on the types of bits being compressed using the channel model 224. In another example, the channel model encoding module 212 automatically selects a channel model 224 to apply based on an bit-error rate associated with the selected channel model 224. In yet a further example, the channel model encoding module 212 selects a channel model 224 that is designated as a base or default channel model 224 (e.g., channel model 602A) and then selects alternative or different channel models 224 while the compressed bitstream is being transmitted. In one embodiment, the change or switch in the channel model occurs between transmission packets, such that a successive transmission packet identifies the channel model being selected. This implementation ensures that the optical receiver 110 is informed of the changed in the channel model 224.

As discussed above, the output of the channel encoding module 212 is a compressed bitstream, where the compressed bitstream includes data from the encoded bitstream as determined by the source coding module 208 and redundant bits as determined by the ECC module 210.

In one embodiment, the channel model encoding module 212 then invokes the baseband modulator/filter 214 and/or the up-converting module 216. As discussed above, the baseband modulator/filter 214 is configured to apply a same modulation technique to the compressed bitstream (Operation 812). After the baseband modulation/filter 214 is applied, the resulting signal may then be communicated to the up-converting module 216 for up-converting the signal from a first input frequency to a second output frequency (Operation 814). In some instances, however, the baseband modulator/filter 214 and/or the up-converting module 216 may be bypassed. The resulting signal, whether modulated and/or up-converted, is then transmitted by the light source 218 over the one or more optical communication paths (Operation 816). Furthermore, each transmission packet may be associated with a transmission power level, as determined by the channel model encoding module 212, where each transmission packet is emitted at the determined transmission power level.

Figure 9:
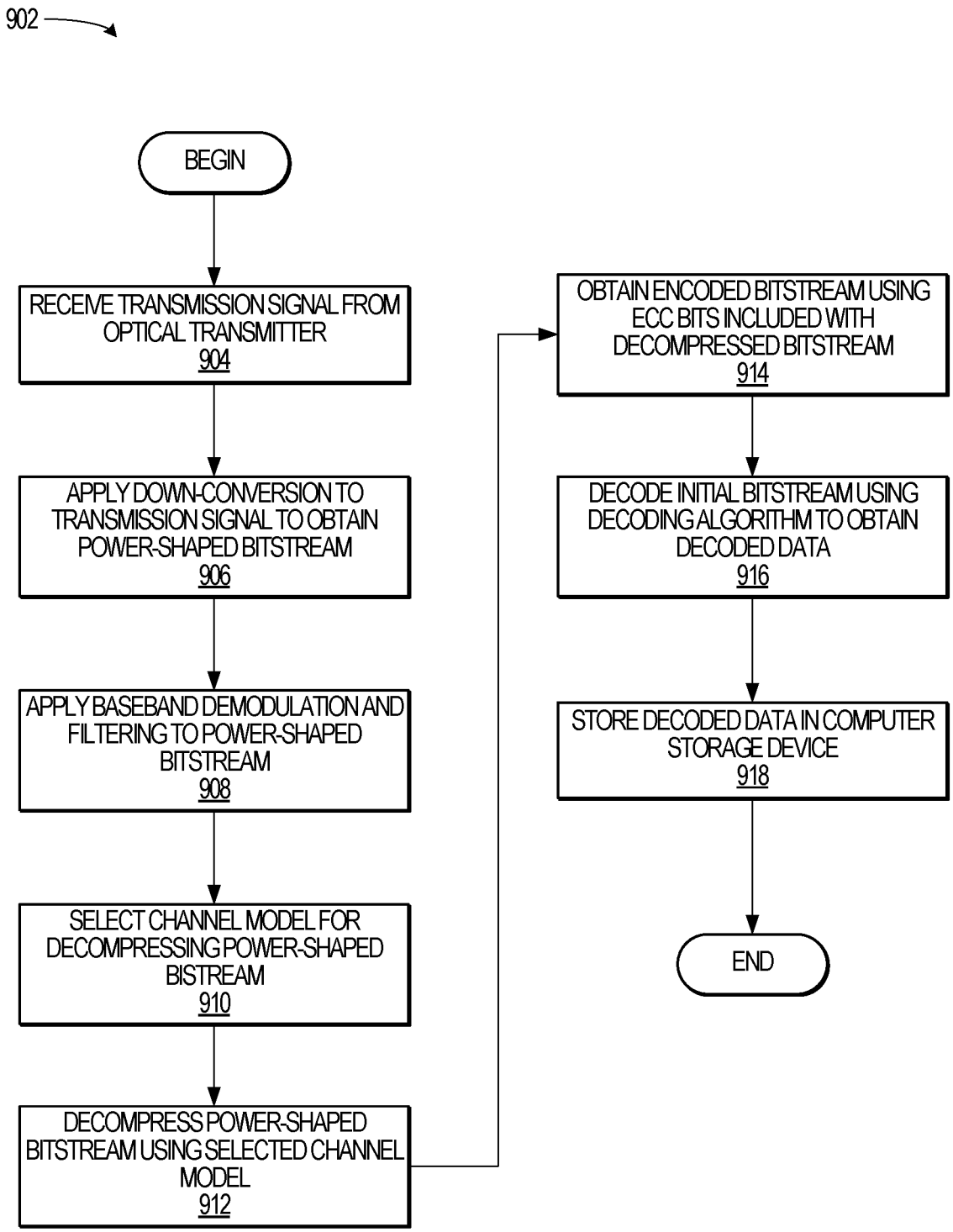
FIG. 9 illustrates a method, in accordance with an example embodiment, for receiving an encoded bitstream using the optical receiver of FIG. 1.

FIG. 9 illustrates a method 902, in accordance with an example embodiment, for receiving an encoded bitstream using the optical receiver 110 of FIG. 1. The method 902 may be performed by one or more of the components illustrated in FIGS. 2-3, and is discussed by way of reference thereto.

Initially, the optical receiver 110 receives a transmission from the optical transmitter 109 via one or more optical communication paths 116-118 and/or network 120 (Operation 904). Depending on whether the transmission has been up-converted, the optical receiver 110 may then execute the down-converting module 309 to down-convert the transmission bitstream from a first frequency to a second frequency (Operation 906). As discussed above, the output from the down-converting module 309 may then be communicated to the baseband demodulator 310, which demodulates an encoded signal (e.g., the compressed bitstream) from a carrier signal (Operation 908). In some instances, the down-converting module 308 and/or the baseband demodulator 310 may be bypassed, in which case, the received transmission signal may be communicated to the channel model decoding module 312.

The one or more processor(s) 302 may then identify and/or determine the channel model used to encode the transmitted bitstream (Operation 810). In one embodiment, the transmitted bitstream includes a channel model identifier that identifies the particular channel model used to encode the transmitted bitstream. As discussed above, each transmission packet may include a predetermined bit or set of bits that stores an identifier for the selected channel model. The optical receiver 110 then selects the channel model from the channel model(s) 326 based on the channel model identifier.

Having selected the identified channel model, the optical receiver 110 then applies a power-based decompression algorithm to decompress one or more of the transmission packets (Operation 912). The output from the channel model decoding module 312 is a bitstream that has been source coded by the source coding module 208 (e.g., an encoded bitstream) along with one or more redundant bits.

The ECC decoding module 316 then determines whether to perform error correction control on the encoded bitstream (e.g., the bitstream output by the channel model decoding module 312) based on one or more redundant bits included in the bitstream (Operation 914). Thereafter, the source decoding module 314 applies a source decoding algorithm on the encoded bitstream to obtain the initial bitstream corresponding to the data 220 previously stored by the optical transmitter 108 (Operation 916). In one embodiment, the source decoding module 314 is instructed to select a source decoding algorithm from the decoding algorithm(s) 324. In another embodiment, the optical receiver 110 and the optical transmitter 108 are configured to select the same source encoding and/or source decoding algorithms. The output from the source decoding module 314 is decoded data, which may be stored in the computer storage device 318 and/or communicated to the computing device 106 via the communication interface 304 (Operation 918). Further still, there may be instances and/or embodiments where ECC decoding and/or source decoding is not applied to the received transmission signal. For example, where the transmission signal has not been source encoded or where the bitstream has not had ECC encoding applied, then the optical receiver 110 may not perform source decoding and/or ECC decoding on the received transmission signal.

Figure 10:
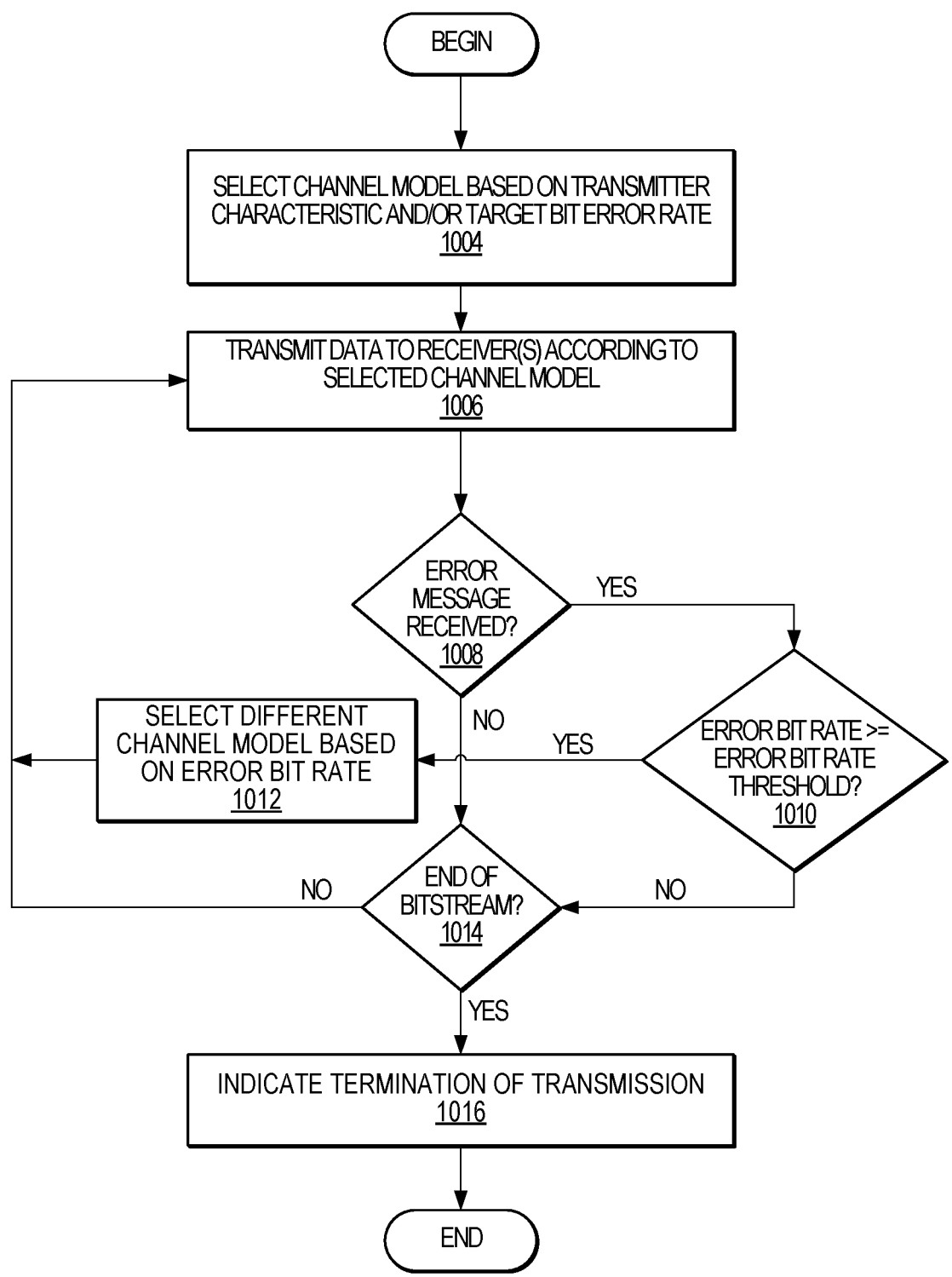
FIG. 10 illustrates a method, in accordance with an example embodiment, for transmitting data over an optical communication path using a selected channel model.

FIG. 10 illustrates a method 1002, in accordance with an example embodiment, for transmitting an input bitstream using a particular channel model and adaptively selecting a different channel model based on bit-error rate communicated by a receiver of the input bitstream. The method 1002 may be implemented by one or more of the devices illustrated in FIGS. 1-3 and is discussed by way of reference thereto. Operations and/or steps that may be implemented include those operations and/or steps discussed in FIG. 8 and their omission is to aid in readability and clarity. One of ordinary skill in the art will appreciate that the operations and/or steps discussed in FIG. 8 may also be combined with one or more of the operations and/or steps discussed in FIG. 10 and vice versa.

Initially, an optical transmitter, such as the optical transmitter 108, selects a channel model (e.g., one of channel models 602A-602C) for communicating an input bitstream to an optical receiver, such as the optical receiver 110 (Operation 1004). The selection of the channel model may be based on one or more characteristics of the equipment and/or transmission medium being used to communicate the input bitstream. The selection of the channel model may also be based on the type of bits and/or priority of the bits being transmitted in the input bitstream.

The optical transmitter 108 then communicates the input bitstream using the selected channel model (Operation 1006). As the optical transmitter 108 is transmitting the bitstream to the optical receiver 110, the optical transmitter 108 may intermittently poll or await for one or more messages from the optical receiver 110 acknowledging the transmission and/or informing the optical transmitter 108 of whether errors were received in the transmitted bitstream (Operation 1008). As discussed above, the messages from the optical receiver 110 may include information that an error was detected, the number of errors detected, an bit-error rate (e.g., based on the most recent transmission from the optical transmitter 108), or any other such message or combination thereof. Where the optical transmitter 108 determines that an error message has been received (e.g., the "YES" branch of Operation 1008), the method 1002 proceeds to Operation 1010. Alternatively, where an error message has not yet been received (e.g., the "NO" branch of Operation 1008), the method 1002 proceeds to Operation 1014, where the optical transmitter 108 determines whether the end of the input bitstream has been reached (Operation 1014).

At Operation 1010, the optical transmitter 108 determines, based on the message from the optical receiver 110, whether a determined bit-error rate meets and/or exceeds an bit-error rate threshold (Operation 1010). As discussed above, the bit-error rate threshold may be an upper bit-error rate threshold that indicates whether optical transmitter 108 should select a channel model that is prone to less errors. Although not specifically shown in method 1002, the method 1002 may also include a determination whether the determined bit-error rate is less than a lower bit rate threshold, which would indicate that the optical transmitter 108 may use a channel model that is more prone to errors (e.g., has more mappings of transmission power levels to sequences of repeating same bit values).

Where the optical transmitter 108 determines that the determined bit-error rate is greater than or equal to the bit-error rate threshold (e.g., the "YES" branch of Operation 1010), the method 1002 proceeds to Operation 1012, where the optical transmitter 108 selects a different channel model for transmitting the input bitstream. In one embodiment, each of the channel models are associated with one or more bit-error rates, and the optical transmitter 108 selects a channel model based on the corresponding bit-error rate that is less than or equal to the bit-error rate threshold. The bit-error rates for each of the channel models (e.g., channel models 602A-602C) may be determined through empirical testing of various transmission bitstreams between the optical transmitter 108 and the optical receiver 110. The method 1002 then proceeds to Operation 1006, where the optical transmitter 108 continues transmitting the input bitstream according to the selected channel model.

Where the optical transmitter 108 determines that the determined bit-error rate does not meet or exceed the bit-error rate threshold (e.g., the "NO" branch of Operation 1010), the method 1002 proceeds to Operation 1014, where the optical transmitter 108 determines whether the end of the input bitstream has been reached. Where the optical transmitter 108 determines that the end of the input bitstream has not been reached (e.g., the "NO" branch of Operation 1014), the method 1002 proceeds back to Operation 1006, where the optical transmitter 108 continues its transmission of the input bitstream according to the selected channel model. Otherwise, where the optical transmitter 108 determines that the end of the input bitstream has been reached (e.g., the "YES" branch of Operation 1014), the method 1002 may proceed to Operation 1016, where the optical transmitter 108 may send a message or packet of information to the optical receiver 110 indicating that the end of the input bitstream has been reached.

Figure 11A:
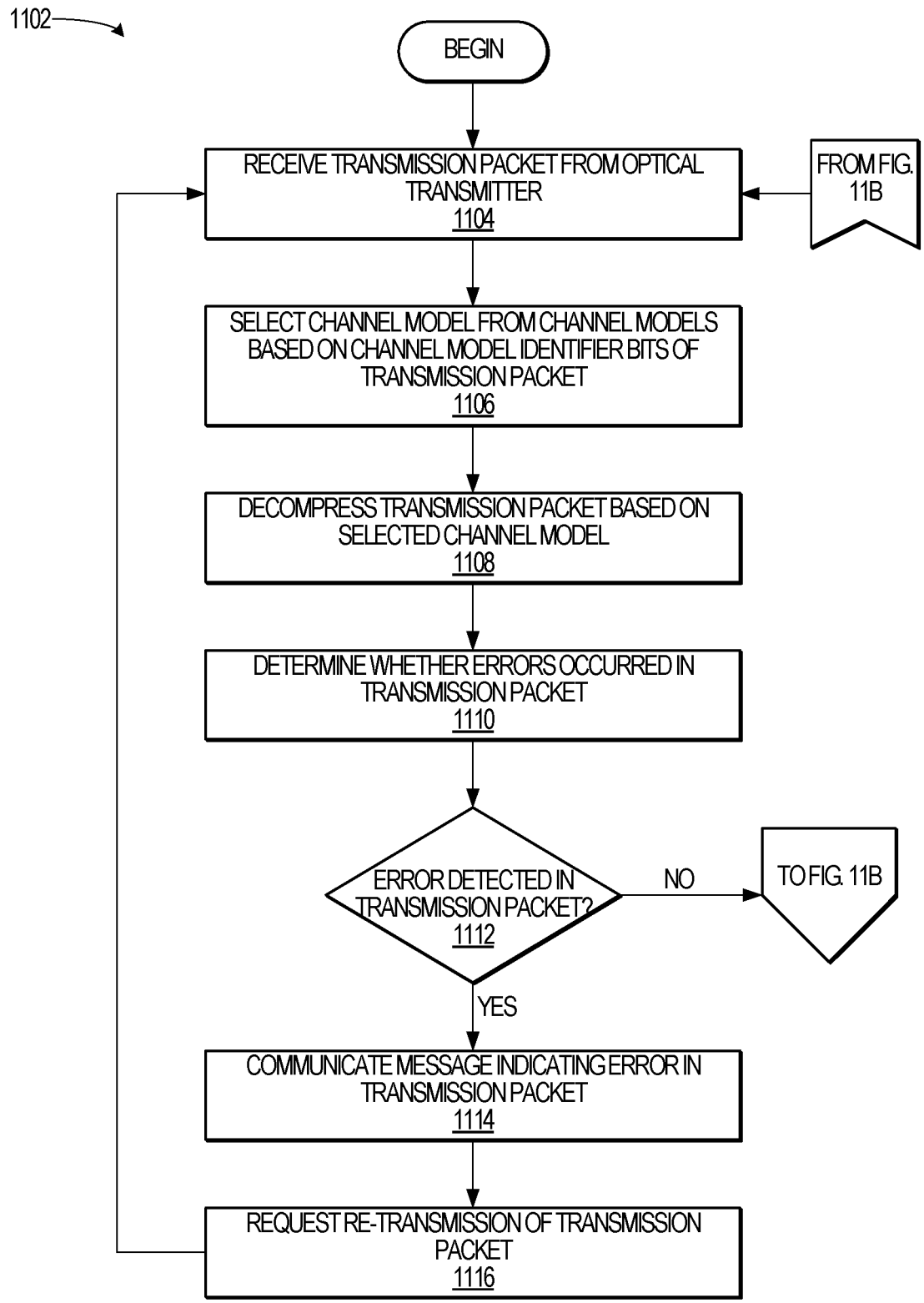
FIGS. 11A-11B illustrates a method, in accordance with an example embodiment, for receiving data over an optical communication path, where the data has been compressed using a selected channel model.
Figure 11B:
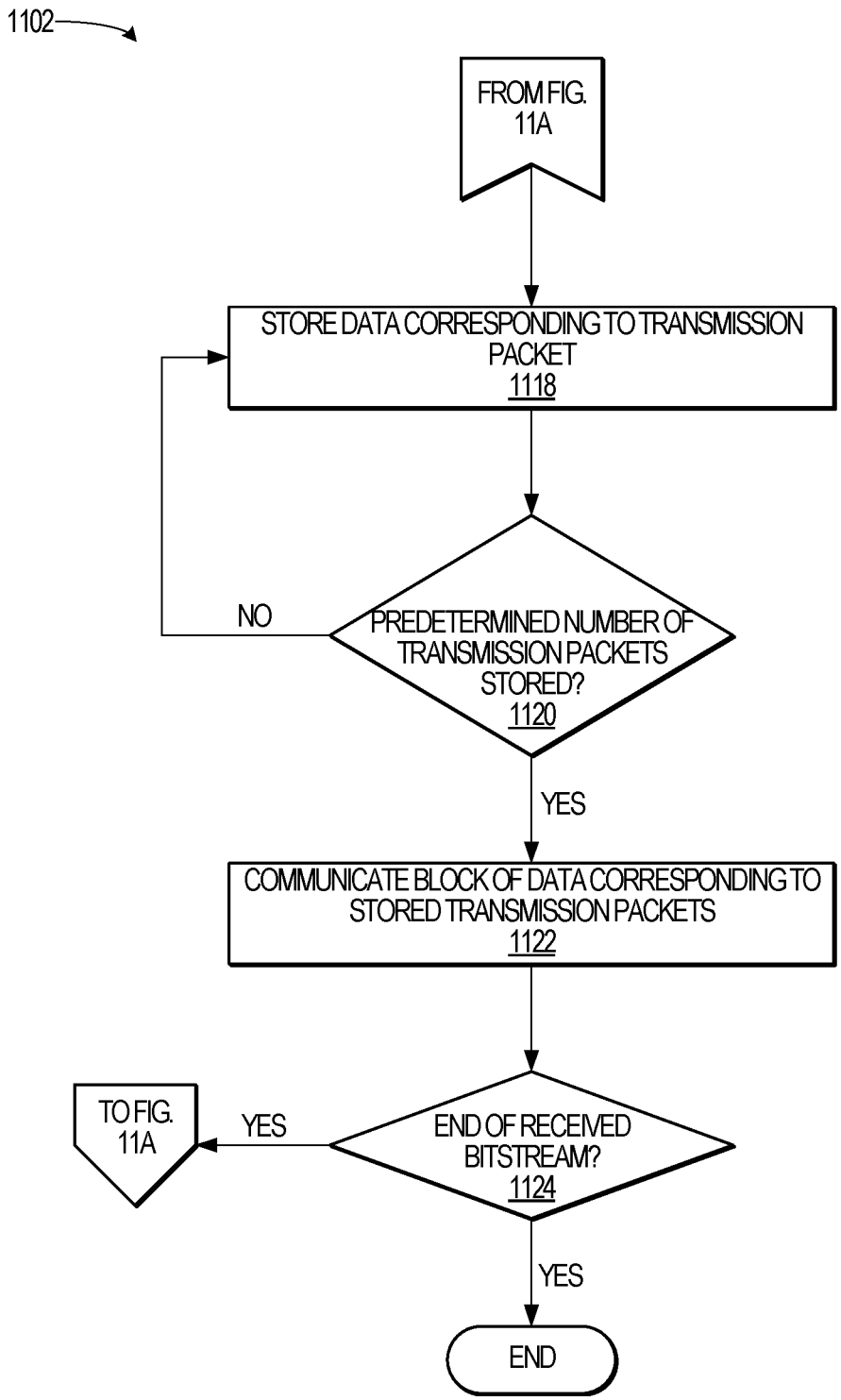

FIGS. 11A-11B illustrates a method 102, in accordance with an example embodiment, for receiving data over an optical communication path, where the data has been compressed using a selected channel model 224,326. The method 1102 may be implemented by one or more of the components or devices illustrated in FIGS. 2-3 and is discussed by way of reference thereto. Operations and/or steps that may be implemented include those operations and/or steps discussed in FIG. 9 and their omission is to aid in readability and clarity. One of ordinary skill in the art will appreciate that the operations and/or steps discussed in FIG. 9 may also be combined with one or more of the operations and/or steps discussed in FIGS. 11A-11B and vice versa.

Referring initially to FIG. 11A, an optical receiver 110 receives a bitstream from the optical transmitter 108, where the bitstream includes a plurality of transmission packets (Operation 1104). As discussed above, the one or more bits of the transmission packet may be designated as channel model identifier bits. Accordingly, the optical receiver 110 reads the channel model identifier bits and selects a channel model from the channel model(s) 326 (Operation 1106). The optical receiver 110 then decompresses the received transmission packet according to the power-based decompression algorithm corresponding to the selected channel model (Operation 1108). As discussed with regard to FIG. 9, the optical receiver 110 may also engage in other operations (e.g., down-converting, baseband demodulation, etc.) with regard to the received transmission packet.

The optical receiver 110 then determines whether an error has occurred in the transmission packet (Operation 1110). In one embodiment, the optical receiver 110 determines whether an error has occurred by performing error-correction control and source decoding on the received transmission packet. Where the optical receiver 110 determines that an error has occurred in the transmission packet (e.g., the "YES" branch of Operation 1112), the method 1102 proceeds to Operation 1114, where the optical receiver 110 communicates a message to the computing device 106 that an error has occurred. The computing device 106 may then request re-transmission of the received transmission packet (e.g., via an optical transmitter 114 communicatively coupled to the computing device 106) (Operation 1116). Alternatively, where the optical receiver 110 includes its own optical transmitter, the optical receiver 110 may request a re-transmission of the received transmission packet from the optical transmitter 108. Where the optical receiver 110 includes its own optical transmitter, the optical receiver 110 may skip Operation 1114 and proceed to Operation 1116 from Operation 1112 when an error is detected in the transmission packet. The method 1102 then returns to Operation 1104 where the optical receiver 110 processes the next transmission packet of the bitstream. The next transmission packet may be the re-transmitted transmission packet or it may be the next sequential transmission packet of the received bitstream.

Where an error is not detected in the received transmission packet (e.g., the "NO" branch of Operation 1112), the method 1102 proceeds to Operation 1118 illustrated in FIG. 11B. Referring to FIG. 11B, at Operation 1118, the optical receiver 110 stores the payload and/or data of the received transmission packet (Operation 1118). For example, the payload and/or data may be stored in a temporary storage location (e.g., RAM) housed within the optical receiver 110. The optical receiver 110 then determines whether a predetermined number of transmission packets have been saved in this manner (Operation 1120). For example, the optical receiver 110 may monitor the amount of storage available in the RAM of the optical receiver 110 and, the optical receiver 110 may act on the temporary data when the amount of available storage in the RAM reaches a predetermined threshold. Additionally and/or alternatively, the optical receiver 110 may maintain a resettable counter that is incremented each time a transmission packet is received, and the optical receiver 110 may reset that resettable counter after the completion of Operation 1122. At Operation 1122, the optical transmitter 110 communicates a block of data corresponding to the payload and/or data of previously received transmission packets to the computing device 106 (Operation 1122). At Operation 1124, the optical receiver 110 determines whether the end of the bitstream has been reached.

In one embodiment, the optical receiver 110 determines that the end of the bitstream has been reached when the transmission packet includes an end-of-transmission (EOT) character. Accordingly, where the optical receiver 110 determines that the end of the bitstream has been reached (e.g., the "YES" branch of Operation 1124), the method 1102 ends or terminates. Alternatively, where the optical receiver 110 determines that the end of the bitstream has not been reached (e.g., the "NO" branch of Operation 1124), the method 1102 proceeds back to Operation 1104 of FIG. 11A where the optical receiver 110 processes the next transmission packet of the received bitstream.

In this manner, the optical transmitter 108 and/or optical receiver 110 may implement different channel models for communicating a bitstream, and the optical transmitter 108 may selectively choose the channel model based on a variety of optical channel characteristics. Further still, the selection of the channel model may be performed adaptively such that the optical transmitter 108 selects a different channel model according to a determined bit-error rate so as to minimize the bit errors in the transmission from the optical transmitter 108 to the optical receiver 110. These additional implementations provide a technical benefit in the field of telecommunications as they seek to improve the quality of communication between telecommunication equipment and decrease the number of errors that could occur in the transmission between a transmitter and receiver.

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with various embodiments described herein are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 12:
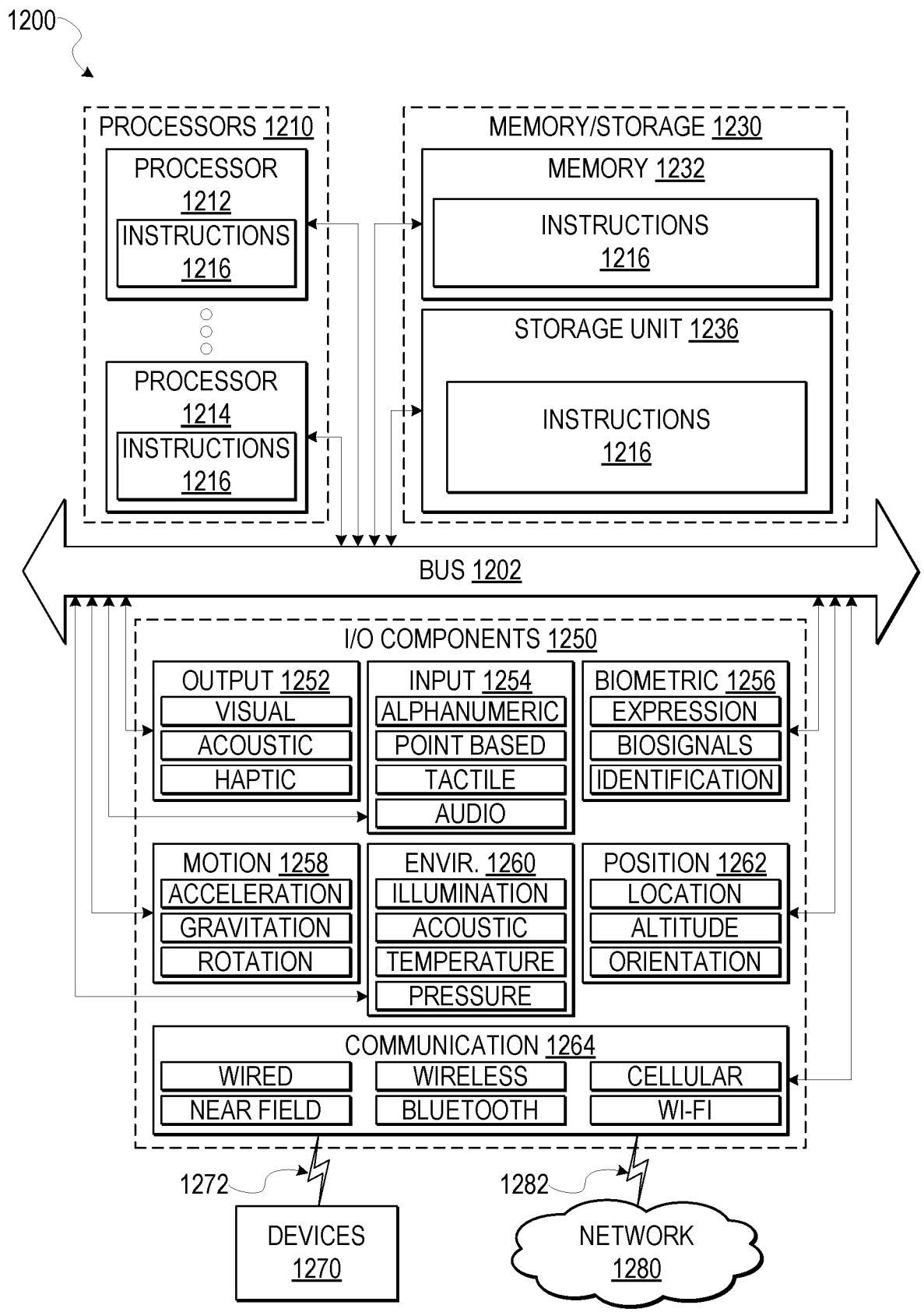
FIG. 12 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 12 is a block diagram illustrating components of a machine 1200, according to some example embodiments, able to read instructions from a machine-readable medium (e.g., a machine-readable storage medium or machine-readable storage device) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the methods illustrated in FIGS. 8-11B. Additionally, or alternatively, the instructions 1216 may implement one or more of the components of FIGS. 2-3. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a PDA, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1212 and processor 1214 that may execute the instructions 1216. The term "processor" is intended to include multi-core processor that may comprise two or more independent processors (sometimes referred to as "cores") that may execute instructions 1216 contemporaneously. Although FIG. 9 shows multiple processors 1210, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" includes a machine-readable storage device able to store instructions 1216 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 16. The I/O components 1250 are grouped according to functionality merely for simplifying the following discussion and the grouping is in no way limiting. In various example embodiments, the I/O components may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272, respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geo-location, location via Wi-Fi® signal triangulation, location via detecting a NFC beacon signal that may indicate a particular location, and so forth.

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A method for transmitting data over an optical communication path, the method comprising:
  receiving a bitstream for transmission over an optical communication path;
  selecting a channel model from a plurality of channel models for transmitting a portion of the received bitstream, wherein selecting the channel model is based upon a characteristic of a transmitter and a target bit-error rate given a characteristic of the optical communication path, wherein:
    the plurality of channel models comprises:
      a first channel model comprising:
        a first association between a first bit value with a first transmission power level, the first bit value being transmitted by transmitting at the first power level; and
      a second channel model comprising:
        a second association between the first bit value with a second transmission power level, the first bit value being transmitted by transmitting at the second power level; and
        a third association between repeated, consecutive first bit values and a third transmission power level, the repeated, consecutive first bit values being transmitted by transmitting a single bit of the first bit value at the third transmission power level; and
  transmitting, at the transmitter, the portion of the bitstream according to the selected channel model.

2. The method of claim 1, wherein the characteristic of the transmitter comprises a maximum, configured output transmission power level.

3. The method of claim 2, wherein the maximum, configured output transmission power level comprises a power level that increases linearly with an input power level.

4. The method of claim 1, wherein selecting the channel model from the plurality of channel models is further based on whether the portion of the received bitstream corresponds to control bits.

5. The method of claim 1, wherein selecting the channel model from the plurality of channel models is further based on a priority level of data corresponding to the portion of the received bitstream.

6. The method of claim 1, wherein:
  the first transmission power level corresponds to a first value in the first channel model and the second transmission power level corresponds to a second value in the second channel model; and
  the second value is less than the first value.

7. The method of claim 1, further comprising:
  receiving a feedback message from a receiver of the portion of the bitstream indicating a threshold number of errors in the transmission of the portion of the bitstream;
  selecting a different channel model from the plurality of channel models in response to the received feedback message; and
  re-transmitting the portion of the bitstream according to the different channel model.

8. The method of claim 1, wherein selecting the channel model from the plurality of channel models is based on a plurality of previously received feedback messages indicating an error rate corresponding to a previously selected channel model used to previously transmit another bitstream.

9. A system for transmitting data over an optical communication path, the system comprising
  a computer storage device having computer-executable instructions stored thereon; and
  a processor communicatively coupled to the computer storage device that, having executed the computer-executable instructions, configures a system to perform a plurality of operations comprising:
    receiving a bitstream for transmission over an optical communication path;
    selecting a channel model from a plurality of channel models for transmitting a portion of the received bitstream, wherein selecting the channel model is based upon a characteristic of a transmitter and a target bit-error rate given a characteristic of the optical communication path, wherein:
      the plurality of channel models comprises:
        a first channel model comprising:
          a first association between a first bit value with a first transmission power level, the first bit value being transmitted by transmitting at the first power level; and
        a second channel model comprising:
          a second association between the first bit value with a second transmission power level, the first bit value being transmitted by transmitting at the second power level; and
          a third association between repeated, consecutive first bit values and a third transmission power level, the repeated, consecutive first bit values being transmitted by transmitting a single bit of the first bit value at the third transmission power level; and transmitting, at the transmitter, the portion of the bitstream according to the selected channel model.

10. The system of claim 9, wherein the characteristic of the transmitter comprises a maximum, configured output transmission power level.

11. The system of claim 10, wherein the maximum, configured output transmission power level comprises a power level that increases linearly with an input power level.

12. The system of claim 9, wherein selecting the channel model from the plurality of channel models is further based on whether the portion of the received bitstream corresponds to control bits.

13. The system of claim 9, wherein selecting the channel model from the plurality of channel models is further based on a priority level of data corresponding to the portion of the received bitstream.

14. The system of claim 9, wherein:
the first transmission power level corresponds to a first value in the first channel model and the second transmission power level corresponds to a second value in the second channel model; and
the second value is less than the first value.

15. The system of claim 9, wherein the plurality of operations further comprises:
receiving a feedback message from a receiver of the portion of the bitstream indicating a threshold number of errors in the transmission of the portion of the bitstream;
selecting a different channel model from the plurality of channel models in response to the received feedback message; and
re-transmitting the portion of the bitstream according to the different channel model.

16. The system of claim 9, wherein selecting the channel model from the plurality of channel models is based on a plurality of previously received feedback messages indicating an error rate corresponding to a previously selected channel model used to previously transmit another bitstream.

17. A computer storage device having computer-executable instructions stored thereon that, when executed by a processor, causes a system to perform a plurality of operations comprising:
receiving a bitstream for transmission over an optical communication path;
selecting a channel model from a plurality of channel models for transmitting a portion of the received bitstream, wherein selecting the channel model is based upon a characteristic of a transmitter and a target bit-error rate given a characteristic of the optical communication path, wherein:
the plurality of channel models comprises:
a first channel model comprising:
a first association between a first bit value with a first transmission power level, the first bit value being transmitted by transmitting at the first power level; and
a second channel model comprising:
a second association between the first bit value with a second transmission power level, the first bit value being transmitted by transmitting at the second power level; and
a third association between repeated, consecutive first bit values and a third transmission power level, the repeated, consecutive first bit values being transmitted by transmitting a single bit of the first bit value at the third transmission power level; and transmitting, at the transmitter, the portion of the bitstream according to the selected channel model.

18. The computer storage device of claim 17, wherein the characteristic of the transmitter comprises a maximum, configured output transmission power level.

19. The computer storage device of claim 17, wherein selecting the channel model from the plurality of channel models is further based on whether the portion of the received bitstream corresponds to control bits.

20. The computer storage device of claim 17, wherein selecting the channel model from the plurality of channel models is further based on a priority level of data corresponding to the portion of the received bitstream.

* * * * *